(12) United States Patent  
Sherry

(10) Patent No.: US 6,505,281 B1  
(45) Date of Patent: Jan. 7, 2003

(54) HARD DISK DRIVES EMPLOYING HIGH SPEED DISTRIBUTION BUS

(76) Inventor: Raymond C. Sherry, 4221 Saint Leger Dr., Cleburne, TX (US) 76031

( * ) Notice: Subject to any disclaimer, the term of this patent is extended or adjusted under 35 U.S.C. 154(b) by 0 days.

(21) Appl. No.: 09/908,233

(22) Filed: Jul. 18, 2001

Related U.S. Application Data

(63) Continuation of application No. 09/089,177, filed on Jun. 2, 1998.

(51) Int. Cl.[7] .............................................. G06F 13/14
(52) U.S. Cl. ...................... 711/168; 711/150; 711/151; 711/167; 710/58; 710/60; 710/61; 709/208; 709/211
(58) Field of Search ................................ 709/208–211; 710/52, 58–61; 711/167, 168, 147–150, 112–114

(56) References Cited

U.S. PATENT DOCUMENTS

| | | | |
|---|---|---|---|
| 5,586,250 A | 12/1996 | Carbonneau et al. | 714/44 |
| 5,612,927 A | 3/1997 | Morrison et al. | 361/685 |
| 5,636,358 A | 6/1997 | Brant et al. | 711/117 |
| 5,636,359 A | 6/1997 | Beardsley et al. | 711/122 |
| 5,678,061 A | 10/1997 | Mourad | 710/21 |
| 5,684,674 A | 11/1997 | Yin | 361/695 |
| 5,822,553 A | * 10/1998 | Gifford et al. | 710/129 |
| 5,859,986 A | * 1/1999 | Marenin | 713/401 |
| 5,867,732 A | * 2/1999 | Young | 395/872 |
| 5,951,666 A | * 9/1999 | Ilting et al. | 710/128 |
| 5,974,503 A | * 10/1999 | Venkatesh et al. | 711/114 |
| 6,012,123 A | * 1/2000 | Pecone et al. | 711/114 |
| 6,018,778 A | 1/2000 | Stolowitz | 710/61 |

OTHER PUBLICATIONS

John Fulcher, An Introduction to Microcomputer Systems, undated, Section 10—Mass Storage Devices, Addison–Wesley Publishing Company, Sydney, Australia.

Brian Dipert and Markus Levy, Designing with Flash Memory, 1993, p. 229–291, Annabooks, San Diego, CA, USA.

The RAIDBook—A Source Book for RAID Technology, Second Edition, Published By: The Raid Advisory Board, St. Peter, MN, Nov. 1993.

* cited by examiner

*Primary Examiner*—Than Nguyen
(74) *Attorney, Agent, or Firm*—Roger N. Chauza, Esq.; Chauza & Handley, L.L.P.

(57) ABSTRACT

A processor coupled by a high speed, wideband data bus to a plurality of slave data processing circuits. The data bus includes an N-bit set of master registers loaded by the processor and M number of slave modules, each slave module having an N-bit slave data register. The processor can sequentially load the master data registers and transfer the data to a selected slave module in a round-robin manner. A high speed transfer of data is thereby achieved.

29 Claims, 17 Drawing Sheets

FIG. 7 (DATA WRITE)

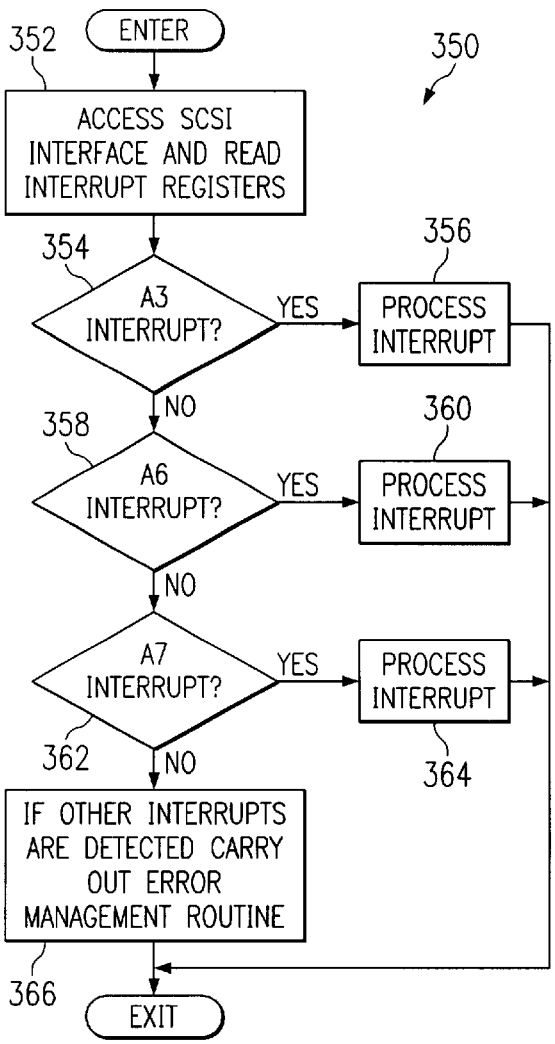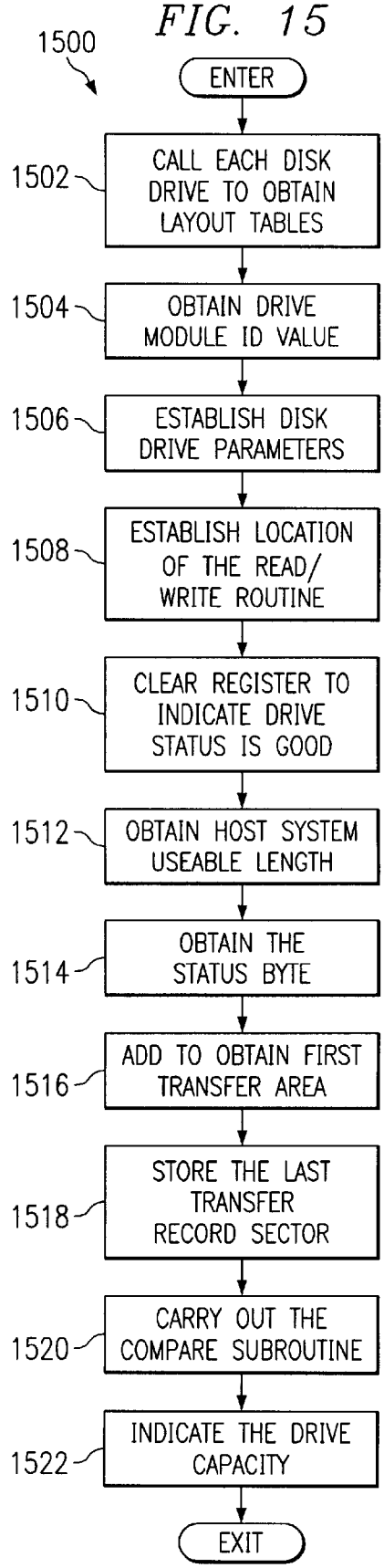

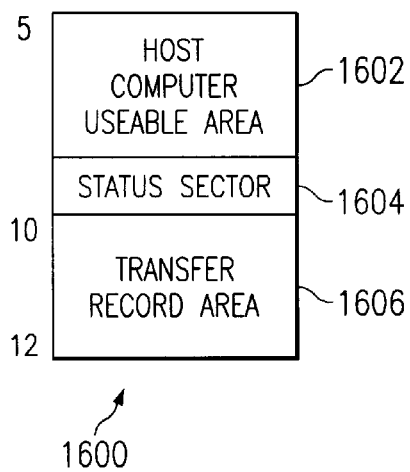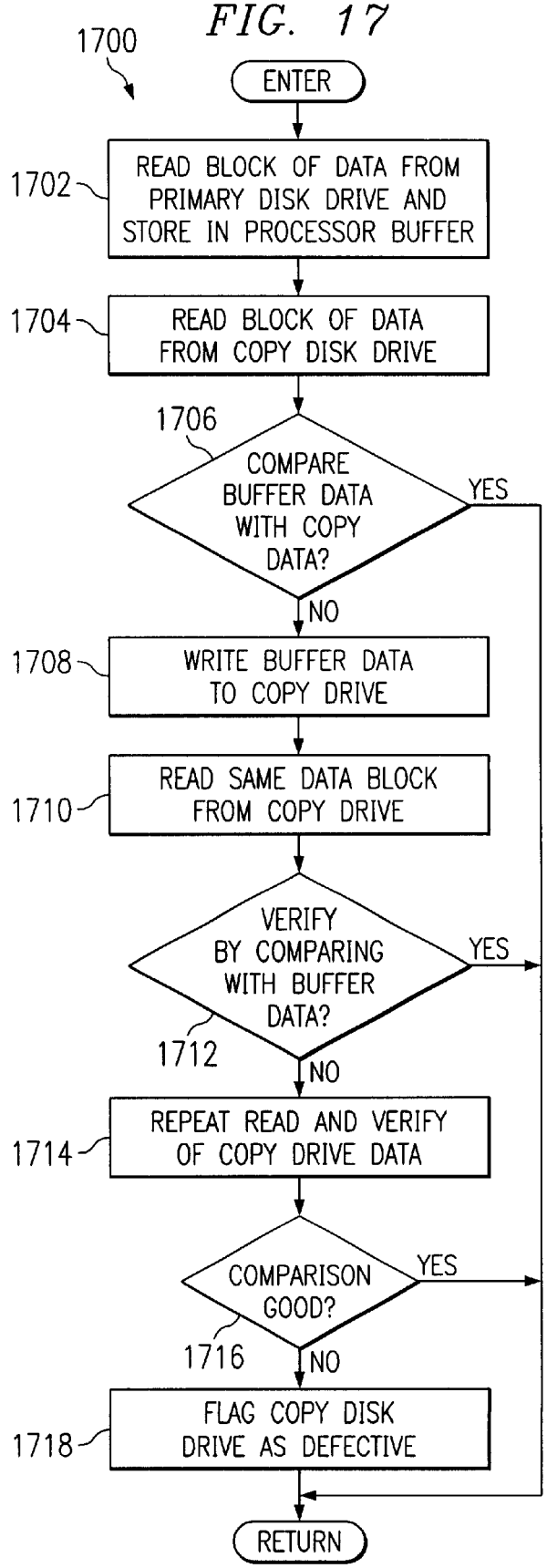

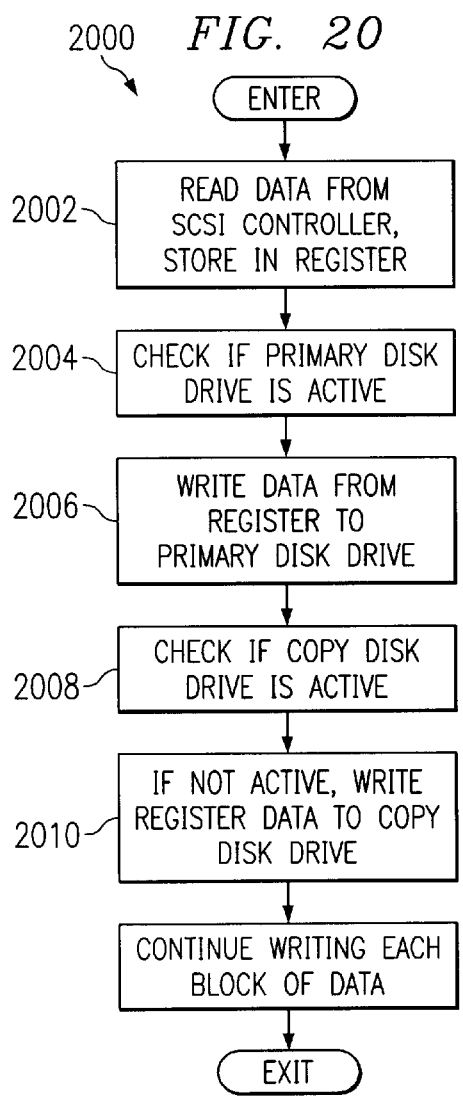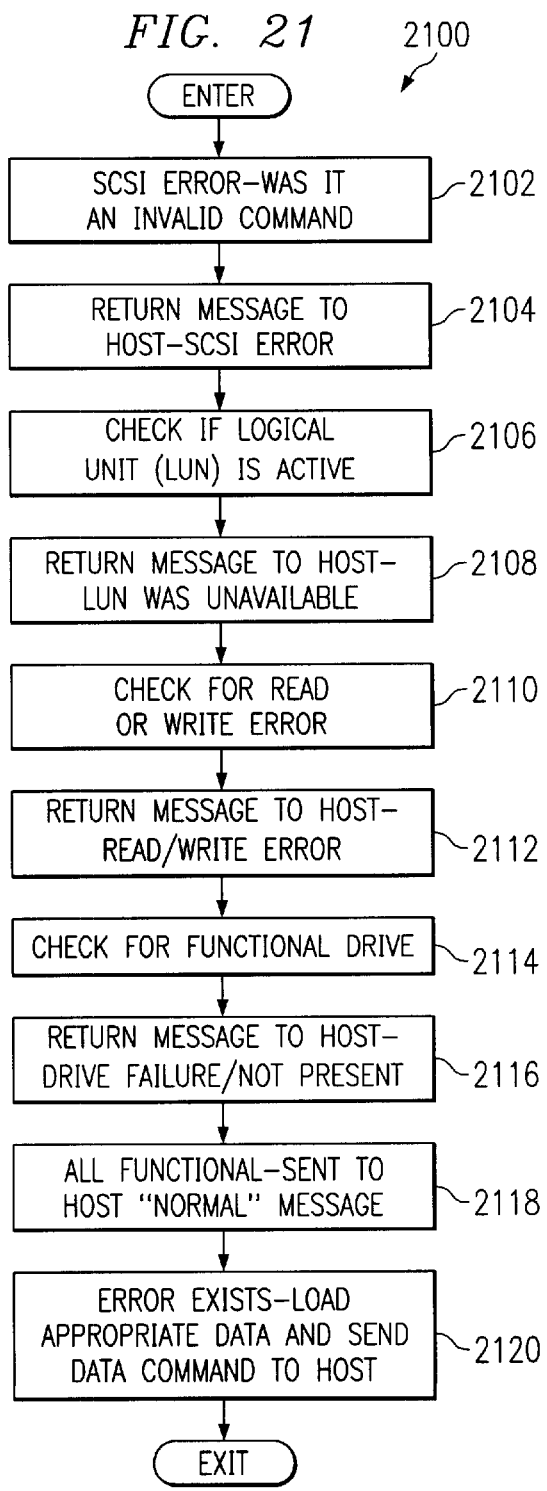

HARD DISK DRIVES EMPLOYING HIGH SPEED DISTRIBUTION BUS

CROSS-REFERENCE TO RELATED APPLICATIONS

This U.S. patent application is a continuation of pending U.S. application Ser. No. 09/089,177, filed Jun. 2, 1998, and entitled "HARD DISK DRIVES EMPLOYING HIGH SPEED DISTRIBUTION BUS", the entire disclosure of which is incorporated herein by reference.

TECHNICAL FIELD OF THE INVENTION

The present invention relates in general to computer systems and mass memory systems, and more particularly to a programmed processor controlling a number of memory modules utilizing a high-speed and wide band data bus for sequentially reading and writing data with regard to the memory modules. The invention also relates to a controller operating in conjunction with a host system, but transparent thereto, for controlling the mass memory system.

BACKGROUND OF THE INVENTION

A memory system of some type is a necessity for the operation of a computer or programmed processor. In addition to the need for a scratch pad type of memory, computers are often also provided with a non-volatile media for either the archival storage of data or for the storage of large amounts of data that are periodically required by the processor. The non-volatile media for storing large amounts of data often include magnetic tape stored on reels. The magnetic tape medium is relatively inexpensive, but the reading and writing of data therefrom is slow. Indeed, when used as a back-up medium for archival purposes, it often takes several hours to provide a complete back-up of a day's data. During the back-up operation, the host system is inaccessible to a user and thus dedicated to the archival back-up function. For this reason, the back-up function is usually carried out after business hours. Any memory failure during the normal business hours thus results in lost data, as no back-up is yet available. Moreover, although the magnetic tape medium is somewhat portable, it is bulky, heavy and can be damaged by external magnetic fields.

Another popular non-volatile storage medium comprises magnetic disks and corresponding disk drive systems. Although hard disk drives are well developed and enjoy a high degree of popularity, such a storage medium is nonetheless prone to mechanical failure, neither the hard disks nor the drive systems themselves are removable, the read and write speeds are much slower than the processing systems, and disk drive systems require a disk operating system (DOS) for organizing the data storage on the magnetic disks.

Floppy disks do indeed provide a portable medium for the non-volatile storage of data. The floppy disks themselves provide a low cost medium, but the access time to such type of disks is slower than that of the hard disk drives, the data is less densely stored thereon and it is not practical to store large amounts of data on the floppy-type disk, as many such disks would be required.

There currently are available disk drive systems that provide mirrored back-up data for archival purposes. Such systems are available from Western Digital Corporation and the Connor Peripheral Company. These systems do provide a continuous back-up of data, but such type of systems are not portable to the user, are not easily expandable to accommodate significant amounts of data, and the host computer system must be programmed to mirror the data, thus reducing the time allowed by the system to carry out its normal programming. Another arrangement for storing data on hard disk drives is known as a redundant array of inexpensive disks, i.e., RAID. A redundant array of independent disks is a disk array in which part of the storage capacity over several disks is used to store redundant information about the user data. The redundant information enables regeneration of user data in the event that one of the array's member disks or the access path to it fails. The RAID system employs "striping" which is the storage of different pieces of a portion of data across plural disks. Further, such a system employs exclusive-or parity of the bits and thus is really a fault tolerant system, and does not redundantly store data. The host computer system employing the RAID technique still requires processing time of the host and thus user applications are executed at a slower pace.

There presently exists removable media cartridges that can store upwardly of 100 megabyte-150 megabyte of data. Such systems are known as "Bernoulli" cartridges, obtainable from Cyquest, Inc. The removable cartridges are low cost, but slower than hard disk drives, less reliable, can't be mirrored by the operating system and thus are not continuously mirrored as back-up data. The CD ROM is becoming a well embedded technology for storing upwardly of 500–700 megabytes of data. However, this non-volatile storage medium can only be read and not written, and the data transfer rate is relatively slow. A CD juke box is equipped to handle more than one CD, but such systems are nevertheless large and bulky, expensive and the media is not updatable.

A relatively new medium for the non-volatile storage of mass data is the read/write optical system, better know as a magneto-optical memory system. Although, the storage density of this type of medium is relatively large, i.e., about 1.3 gigabyte, such systems are relatively expensive, bulky and are not known as high speed access systems Many mass storage memory systems, and particularly the disk drive systems, require a disk operating system for managing and organizing the data stored on the various sectors of a disk. Typical functions carried out by the DOS software are the allocation of appropriate sectors to particular files, the writing of files into various sectors, the compaction of gaps caused by repeated deletion of files, the maintenance of a file directory, the amount of free space left on the disk, the creation of new files, the deletion of old files, the renaming of existing files, etc. Notwithstanding the complexity of the software of a disk operating system, the mechanical movement of the head of the disk drive accounts for the majority of time in accessing data and transferring the data between the disk storage unit and the host system. Because of the overhead involved in controlling disk drives, host CPUs normally include a separate disk controller for carrying out the disk operating system, thus freeing up the CPU for other data processing functions. Hard disk controllers are conventionally available as separate integrated circuits that provide data transfer rates upwardly of 16–25 Mbit/second.

Buses initially developed for interfacing hard disk drives to host computer systems include the small computer systems interface (SCSI) bus. Since the initial development thereof, the SCSI bus has become a general-purpose standard, capable of supporting multiple processors and up to eight peripheral devices. In the SCSI bus, there are eight data lines plus a parity line, in addition to other signal lines. Data transfers in the synchronous mode can take place up to 10 Mbyte/second. Despite the high speed nature of the SCSI bus, it is not fully utilized, due primarily to the mechanical access time of the disk drive, whether it be a hard disk drive or a floppy disk drive. Therefore, unless the host CPU is busy with other data processing functions, it is necessarily involved in waiting for data from the disk drive unit.

From the foregoing, it can be seen that many of the mass storage media is capable of storing large volumes of data, but generally such mediums are slow speed devices which impair the throughput and overall efficiency of the host CPU. It can therefore be seen that a need exists for a data storage and retrieval system that is high speed, continuously mirrored for back-up purposes, is portable to the user, and is adapted for use with any general purpose computer operating with a hard disk drive unit. A further need exists for a hard disk drive replacement unit that operates transparent to the host computer, via a conventional bus, such as an SCSI bus.

Another need exists for a multiple hard disk drive system that can be read or written to supply high speed data to a host computer, via a processor that operates transparent with respect to the host system. An additional need exists for a disk drive replacement unit employing a high speed digital signal processor communicating with multiple, removable hard disk drives, via a high bandwidth data bus. Another need exists for a programmable disk drive replacement system that efficiently reorganizes the data to be read or written on the disk drive, all transparent to the host computer. Another need exists for a disk drive replacement unit that is programmed to function transparent to the host computer, and provide cache-like functions to facilitate the retrieval of data that has been used or read in the past, and thus is more likely to be read again. These needs and others are fulfilled by the many features of the present invention.

SUMMARY OF THE INVENTION

Disclosed herein is a hard disk drive replacement system employing a controller communicating with plural hard disk drive modules by way of a high bandwidth data bus. The disk drive replacement system and the many features thereof overcome many of the shortcomings and problems inherent in the prior art memory storage systems.

In accordance with the preferred embodiment of the invention, the controller includes a high speed digital signal processor that communicates with a host CPU by way of a standard SCSI bus. The digital signal processor operates transparent to the host CPU, and communicates disk drive commands via a high bandwidth bus to plural modular hard disk drive units. The bus accommodates address, control signal and data lines, where each line is associated with a latch or register on the processor side thereof and a latch or register on the slave side thereof, which side is coupled to each hard disk drive module. The digital signal processor controls the bus latches and registers, as well as each of the hard disk drive modules by separate control lines. Each main hard disk drive module is removable, and is associated with a replaceable mirror disk drive module for storing back-up data. The digital signal processor is programmed to provide a continuous update of data that exists in the main unit, to the corresponding mirror unit. Moreover, the digital signal processor can be programmed to encrypt or compress data prior to storing the same on the hard disk drive modules, or to decompress data when read from the modules and transferred to the host CPU.

The registers of the data bus connecting the controller to the disk drive units are bidirectional and can be, for example, 256 bits wide to accommodate sixteen 16-bit disk drive units. The digital signal processor, preferably a 32-bit processor, can sequentially write the bus master latches and registers on the processor side with address, control and data signals which are then transferred to the bus slave latches and registers and held until the disk drive modules are ready to accept the data. In this manner, the processor need not remain coupled to a disk drive unit until the data read/write function is completed, but rather can move to other modules with other commands, and thereafter cyclicly retrieve the data read by the disk drive module in response to a previous request. No wait states are thus required by the processor in reading or writing data to the disk drive units. A zero delay accessing of the disk drive modules can thus be achieved. This data transferral technique is especially well adapted where the plural disk drives are cyclically polled so that even though they are slower speed than the processor, a high speed transferral of data is nevertheless achieved.

In accordance with another embodiment of the invention, the latched zero delay data transfer bus can be connected to modules other than disk drive units, such as yet other processors for processing data. In this connection, the system can function as a multiple ported system, where each processor carries out its individual task.

In accordance with yet another embodiment of the invention, a number of digital signal processors are connected to the high bandwidth zero delay data transfer bus for accessing any one or more of the hard disk drive modules. In this embodiment, a bus arbitration circuit is employed to allow each processor access to the data bus in a coordinated manner.

The efficiency of the disk drive replacement system can be increased by employing various programmed routines in the high speed digital signal processor.

BRIEF DESCRIPTION OF THE DRAWINGS

Further features and advantages will become apparent from the following and more particular description of the preferred and other embodiments of the invention, as illustrated in the accompanying drawings where like reference characters generally refer to same parts, elements or functions throughout the views, and in which:

FIG. 13 is a software flow chart illustrating the detailed functions of the SCSI service interrupt routine;

FIG. 15 is a software flow chart showing the functions carried out in an initialize module data table routine;

FIG. 16 is a diagram illustrating the formatting of the major storage areas of a disk drive;

FIG. 17 is a flow chart of a rebuild copy disk drive routine;

FIG. 20 is a flow chart depicting an SCSI write command routine;

FIG. 21 is a flow chart depicting a request sense command routine; and

DETAILED DESCRIPTION OF THE INVENTION

General Architecture

Figure 1:
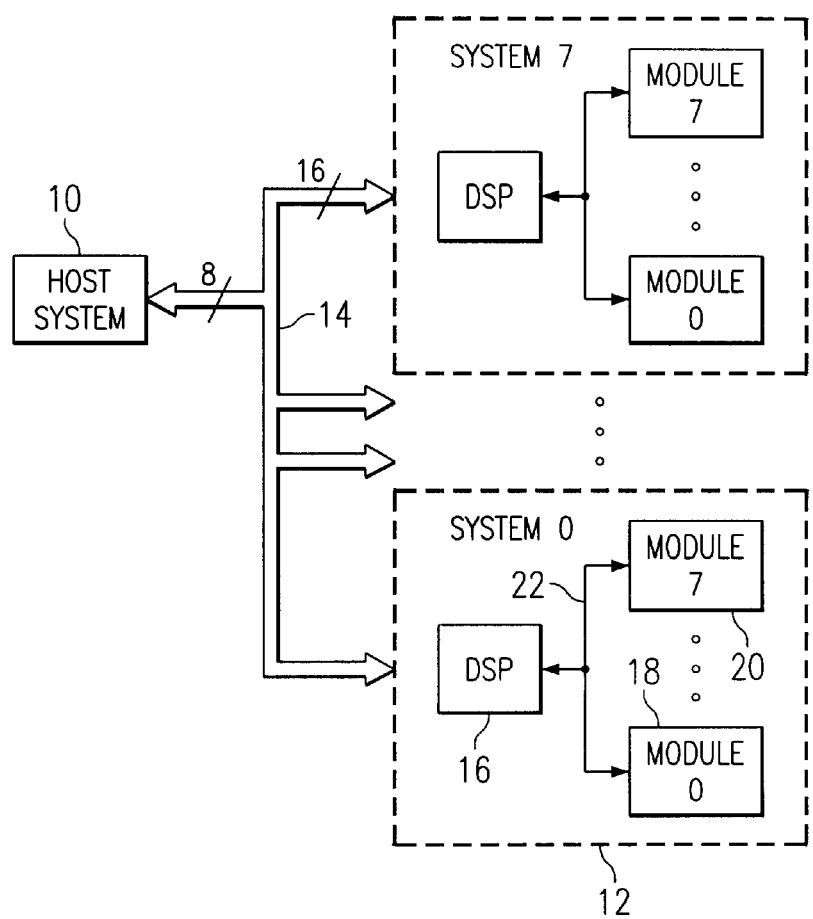
FIG. 1 is a block diagram of a host computer system connected with a standard bus to a number of processor controlled systems, which may be disk drive replacement systems or other functional blocks in multiple modules or chassis.

FIG. 1 illustrates one application in which the principles and concepts of the invention can be advantageously practiced. The application environment depicted by FIG. 1 includes a host computer system 10 communicating by way of a conventional bus 14 with a plurality of data processing systems (systems 0–7), one shown as reference numeral 12. The host system 10 can be any type of a computer or computer system, such as a personal computer, a mainframe computer, a super computer or any other type of general business or engineering computer system. In the preferred embodiment of the invention, the multi-module system 12 comprises a slave hard disk drive replacement unit for the host system 10. The bus 14 can be a small computer system interface (SCSI) bus or any other of the well-known type of bus such as IDE, RLL, MFM, etc. Those skilled in the art readily recognize that SCSI buses coupling initiators and target devices communicate by way of a set of high-level command description bytes, transmitted in packets. The SCSI bus 14 commonly includes eight data lines, a parity line, nine handshake signals which coordinate the transfer of data between the SCSI bus host and one or more target devices. As noted above, synchronous data transfers on the SCSI bus can occur up to ten megabytes per second. In sum, the host system 10 and the particular type of bus 14 shown in FIG. 1 are for purposes of example only, and in no way limits the application or environment of the invention.

The SCSI bus 14 has a structured protocol so as to operate with up to eight target devices, such as shown by systems 0 through 7 of FIG. 1. The multi-module system denoted by reference numeral 12 may be substantially identical to the other seven systems, but need not be. In the example, each multi-module system 12 includes a processor, preferably a digital signal processor 16 connected by way of an SCSI interface (not shown) to the standard SCSI bus 14. Each digital signal processor 16 communicates with its respective slave modules, one slave module shown as reference numeral 18. Communications between the digital signal processor 16 and each of the slave modules 18, 20 is by way of a high speed, high bandwidth bus 22.

As will be described in more detail below, the high bandwidth bus 22 includes address, control and data lines, each having a latch or register on the processor or master side, as well as a corresponding latch or register on the module or slave side. In this manner, the high speed digital signal processor 16 can read or write the various latches or registers at a high speed, simultaneously transfer the address, control signal and data information to be latched at the slave module side, whereby the slower-speed disk drive modules can react to the data appropriately. In other words, the processor 16 can operate at full speed in transferring data on the high bandwidth bus 22 in a specified period of time, and each module 18 can sequentially respond to the data during such time, whereby the processor 16 incurs no wait states. This technique is termed herein a zero delay accessing of the high bandwidth bus 22. With the arrangement shown in FIG. 1, each of the module systems 12 can independently communicate indirectly with the host system 10 by way of the bus 14, and independently process the same or different data independent of the other systems. Such a system is known as a multi-computing system.

Figure 2:
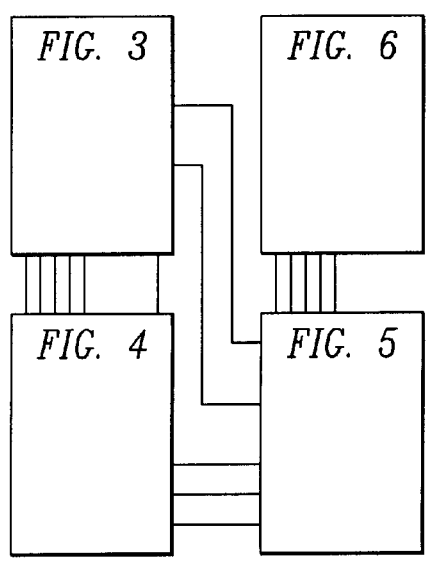
FIG. 2 illustrates a diagram of drawing sheets 2–5 which, when placed in the manner shown, illustrate the details of one hard disk drive replacement system shown in FIG. 1.

FIG. 2 illustrates the arrangement of sheets 2–5 of the drawings which, when placed together in the manner shown, facilitates the understanding of the invention and the signal flow between the circuits depicted on the various drawings.

Processor Circuits

Figure 3:
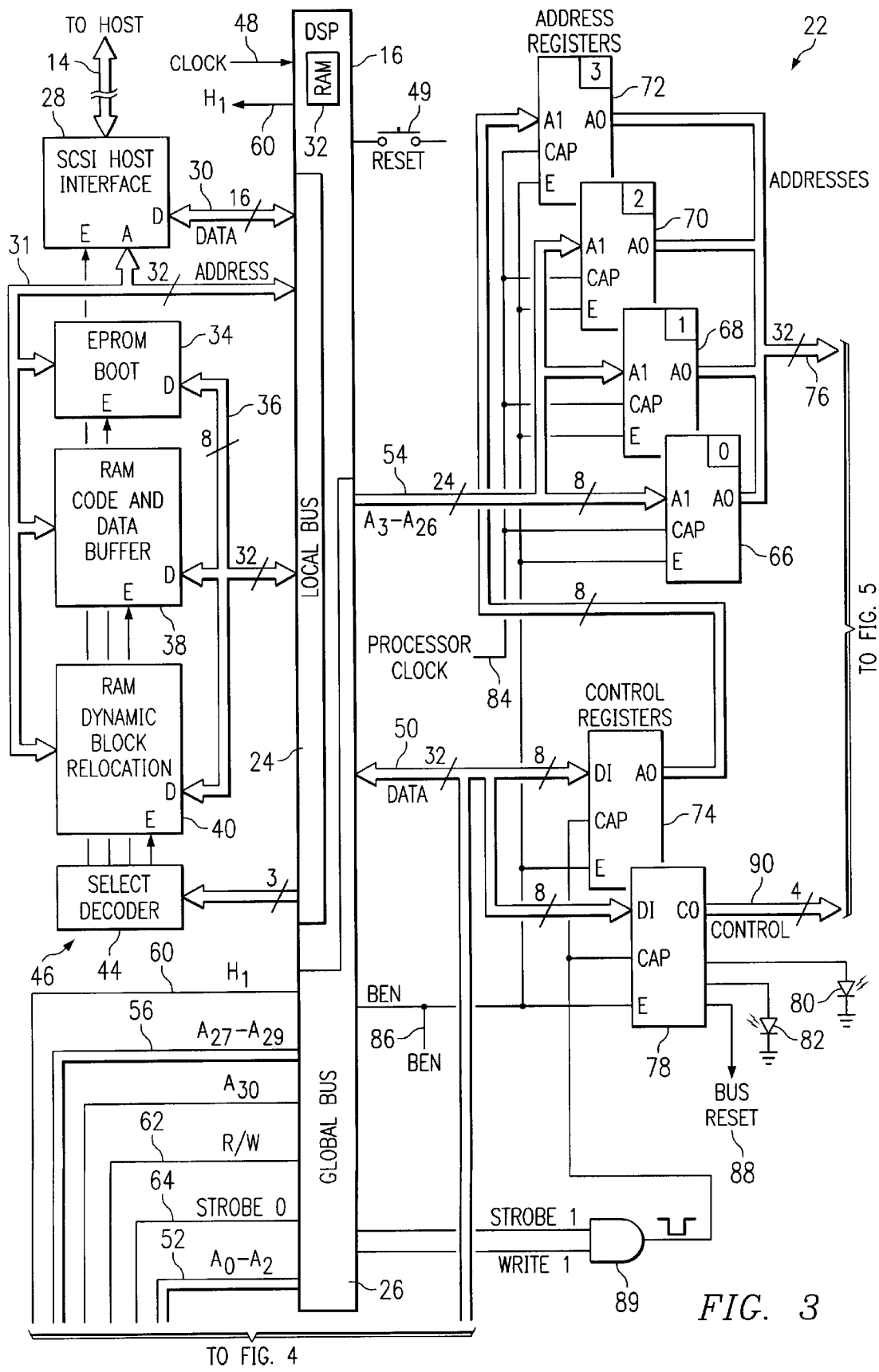
FIG. 3 is a block diagram of the controller, which includes a digital signal processor communicating on one port thereof with an SCSI host interface, and on the other port thereof with an address bus connected to master address latches, a control signal bus connected to master control latches and a processor data bus.

With reference now to FIG. 3, there is shown the digital signal processor 16 and corresponding processor support circuits, as well as a portion of the high bandwidth bus 22. In the preferred embodiment of the invention, the processor 16 is a TMS320C40 digital signal processor, obtainable from Texas Instruments. Although this particular processor is well adapted for use in the present invention, other processors may function satisfactorily with the invention. The processor 16 of the noted type is especially well adapted for providing a high-speed throughput of data between a 32-bit local bus 24 and a 32-bit global bus 26. The local bus 24 and the global bus 26 of the digital signal processor 16 essentially include seven 32-bit internal buses connectable by respective multiplexers to a 32-bit output from the local bus 24 and a 32-bit output from the global bus 26. As will be described in more detail below, the digital signal processor of the type noted is a single cycle instruction processor that can carry out high speed transfers of data between the local bus 24 and the global bus 26 in a single processor cycle. Moreover, the digital signal processor 16 includes an internal DMA controller for facilitating a high transfer rate of data without involving the normal programming of the digital signal processor 16.

The digital signal processor 16 is connected to the host system 10 by way of an SCSI host interface integrated circuit 28. The host interface integrated circuit 28 is of conventional design, readily obtainable from manufacturers such as Motorola, for interfacing processors with SCSI-type buses. Conventional active pull up termination circuits are employed with each line of the SCSI bus. Of course, if the digital signal processor 16 was to be connected with another type of bus, a different interface circuit would be employed for decoding and otherwise communicating in accordance with the protocol of such bus. The host interface circuit 28 is connected to the digital signal processor 16 by a 16-bit bus 30. Read and write commands issued from the host system 10 are communicated to the digital signal processor 16 by way of the host interface 28, rather than being transferred directly to a hard disk drive units that are typically located internal to or integral with the host system 10. To that end, the disk drive replacement system 12 functions in a manner identical to an internal hard disk drive, as seen from the host system 10. The digital signal processor 16 receives the disk drive commands and may dispatch new instructions and signals to the hard disk drive modules 18 to read or write data thereto. As will be described in more detail below, the digital signal processor 16 operates in conjunction with the high bandwidth bus 22 to transfer data to or from the slave hard disk drive modules 18, without incurring any wait states. Indeed, the more requests that are issued from the host system 10 to the digital signal processor 16, the more efficient the hard disk drive replacement system operates.

The digital signal processor 16 includes an internal random access memory 32 as well as off-board EPROM memory for storing instructions for boot-up purposes. The EPROM memory 34 is connected to the local bus 24 of the digital signal processor 16 by way of eight bits of a 32-bit bus 36. Associated with the digital signal processor 16 is a first random access memory 38 for storing therein code and data buffered temporarily during use by the digital signal processor 16. Another performance and response of the hard disk drive replacement system to the requests of the host system 10. The memories 38 and 40 are connected to the local bus of the digital signal processor 16 by way of the 32-bit bus 36. A high speed select decoder 44 is controlled by various bits of the local bus 24 to provide output enable lines for enabling the processor support circuits. The RAM memory 38 and the RAM memory 40 are each enabled separately by respective output decoder lines of the select decoder 44. In like manner, the EPROM memory 44 is enabled by the decoder 44, as is the host interface circuit 28. With this arrangement, the digital signal processor 16 can enable any one of the support circuits, based on the manner in which the digital signal processor 16 is programmed. In the preferred form of the invention, the random access memories 38 and 40 are each 15 nanosecond devices, with storage capabilities of at least 0.5 megabyte each. In practice, the memories 38 and 40 may be a single device, but are shown separately because of the separate functions performed. The decoder 44 is a high speed device, operable within 5 nanoseconds to select any one of the four support circuits.

A clock input 48 is coupled to the digital signal processor 16. The clock is a square wave, operating at a frequency of about 32 megahertz. An output 60 clock $H_1$ is provided by the processor for sequencing circuits shown in FIG. 4. A manual reset switch 49 is connected to a reset input of the processor to initialize the processor and to carry out software routines, such as a back-up routine to cause data on a main disk drive to be backed up on a mirror disk drive.

The global bus 26 of the digital signal processor 16 includes a 32-bit bidirectional data bus 50 and a 31-bit address bus, of which bits $A_0$–$A_2$ form a first address bus 52, address bits $A_3$–$A_{26}$ form a second bus 54 and bits $A_{27}$–$A_{29}$ form a third address bus 56. As will be described more fully below, address bits $A_0$–$A_2$ function to select which one of eight groups of 32-bit data registers 58 (FIG. 4) on the master side of the bus 22 are to be read or written. Address bits $A_3$–$A_{26}$ carried on bus 54 provide the requisite number of bits for physical addressing of different bits, bytes or fields in the slave modules 18. Address bits $A_{27}$–$A_{29}$ carried by bus 56 determine which of the eight slave modules 18 are to be active, and thus these address bits function as module select bits. As can be appreciated, the number of address bits shown are utilized merely for the particular architecture of the preferred embodiment, it being realized that other architectures may require more or fewer address bits for performing the specified functions.

Figure 4:
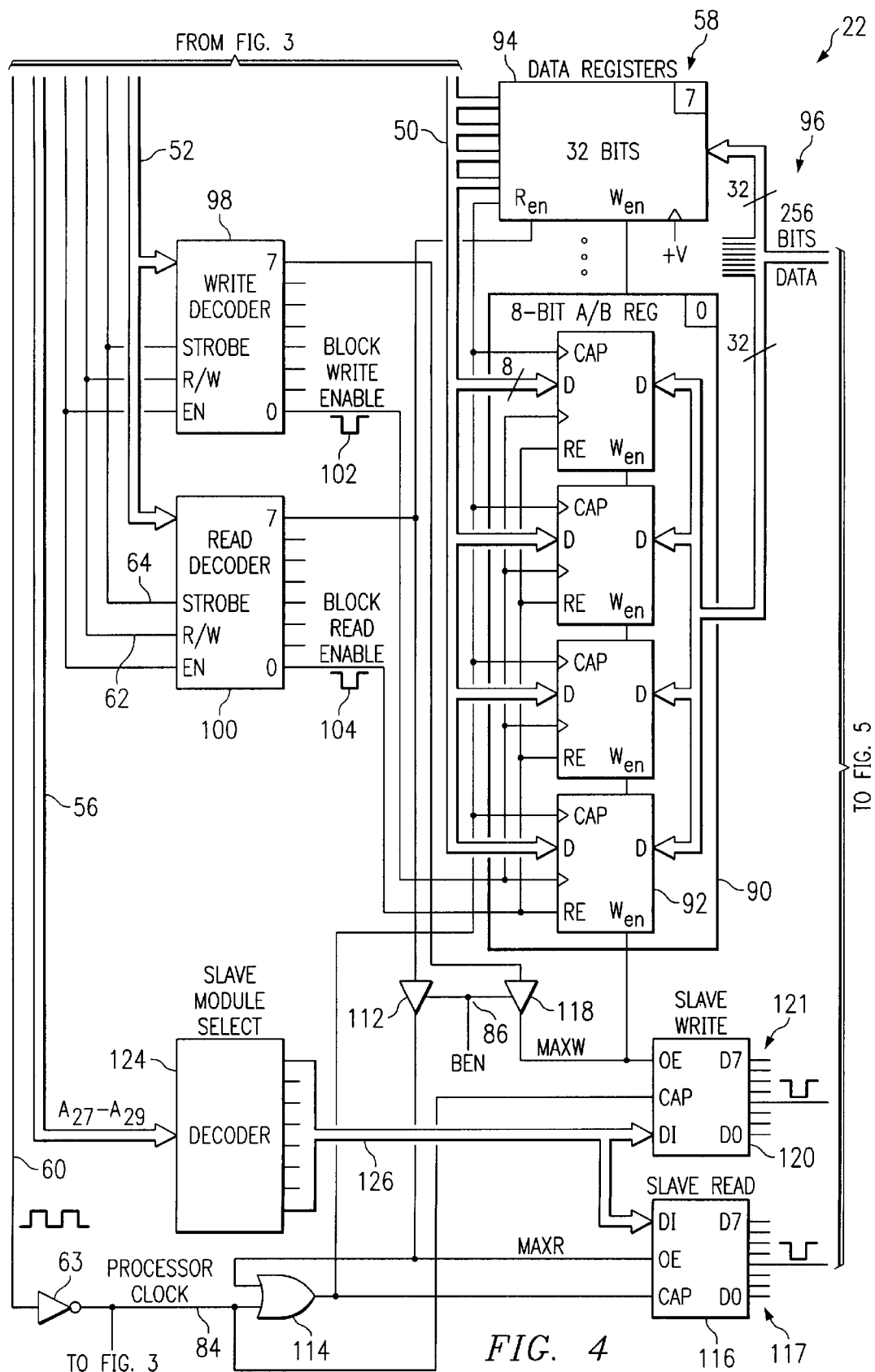
FIG. 4 illustrates the plural master data registers controlled by the digital signal processor, together with read and write control signals for controlling the various slave disk drive modules.

As noted above, the digital signal processor 16 includes as an output 26 a divide-by-two clock output 60 identified as H1 which, when inverted by inverter 63 provides the processor clock 84 to the master data register circuits of FIG. 4. A read/write (R/W) signal is output by the processor 16 on output 62, while a strobe 0 signal is provided on output 64 of the global bus 26. The R/W and strobe signals are coupled to the read and write decoders shown in FIG. 4.

Processor Address and Control Signal Latches

Three groups of eight address bits from processor address bus 54 are coupled to respective address latches 66, 68 and 70. Each latch is an 8-bit device having an address input, an address output, a capture clock input and an enable input. The fourth group of eight addresses is stored in latch 72, however, the address bits do not originate from the address bus 54, but rather from the data bus 50. Eight bits of data stored in an 8-bit latch 74 define eight additional addresses. The outputs of the control register latch 74 are coupled to the forth group of eight address bits, and stored in the address latch 72. With this arrangement, thirty-two bits of address information are provided on the high speed address bus 76. The high speed address bus 76 physically extends from the controller module 16 (see FIG. 1) as printed circuit board backplane conductors to the plural slave modules 18–20. The control signal bus 90 and the data bus 96 are physically extended between the controller 16 and the slave modules.

Seven bits of control signal information are stored in the control latch 78. Eight bits of control data are coupled to the control latch 78 by way of the data bus 50. The control signals can identify different commands, such as, read, write, erase, program, status, etc. Coupled to one output of the control latch 78 is a "read" light emitting diode 80, and to another output of the control latch 78 a "write" light emitting diode 82. The LED indicators 80 and 82 provide a visual indication when the high bandwidth bus 22 is carrying out either a read or write operation with respect to the slave hard disk drive modules 18. A seventh output of the control latch 78 provides a bus reset signal 88 for resetting the slave module circuits. Each of the address and control signal latches can be high speed integrated circuits of the SN74ABT574 type.

The address latches 66–72 are each clocked with a processor clock signal 84, which signal is shown at the bottom of FIG. 4, as the output of inverter 63. As noted above, the processor clock 84 is half the frequency of the digital signal processor clock 84. The control signal registers 74 and 78 are each clocked with a signal derived by the logical ANDing by gate 89 of a strobe 1 signal and a write 1 signal, both of which are generated directly by the digital signal processor 16. Each of the address registers 66–72 and the control signal registers 74 and 78 are enabled by a bus enable signal 86. The bus enable signal 86 is also coupled to a Ready input of the digital signal processor 16, as well as other circuits shown in FIG. 4. In the event a number of digital signal processors time multiplex a single high bandwidth bus 22, the coordination between the processors and the bus 22 is carried out by an arbitration circuit described below in conjunction with FIG. 10. In the event only a single processor 16 utilizes the high-bandwidth bus 22, the bus enable line 86 is connected to a logic high voltage.

Figure 5:
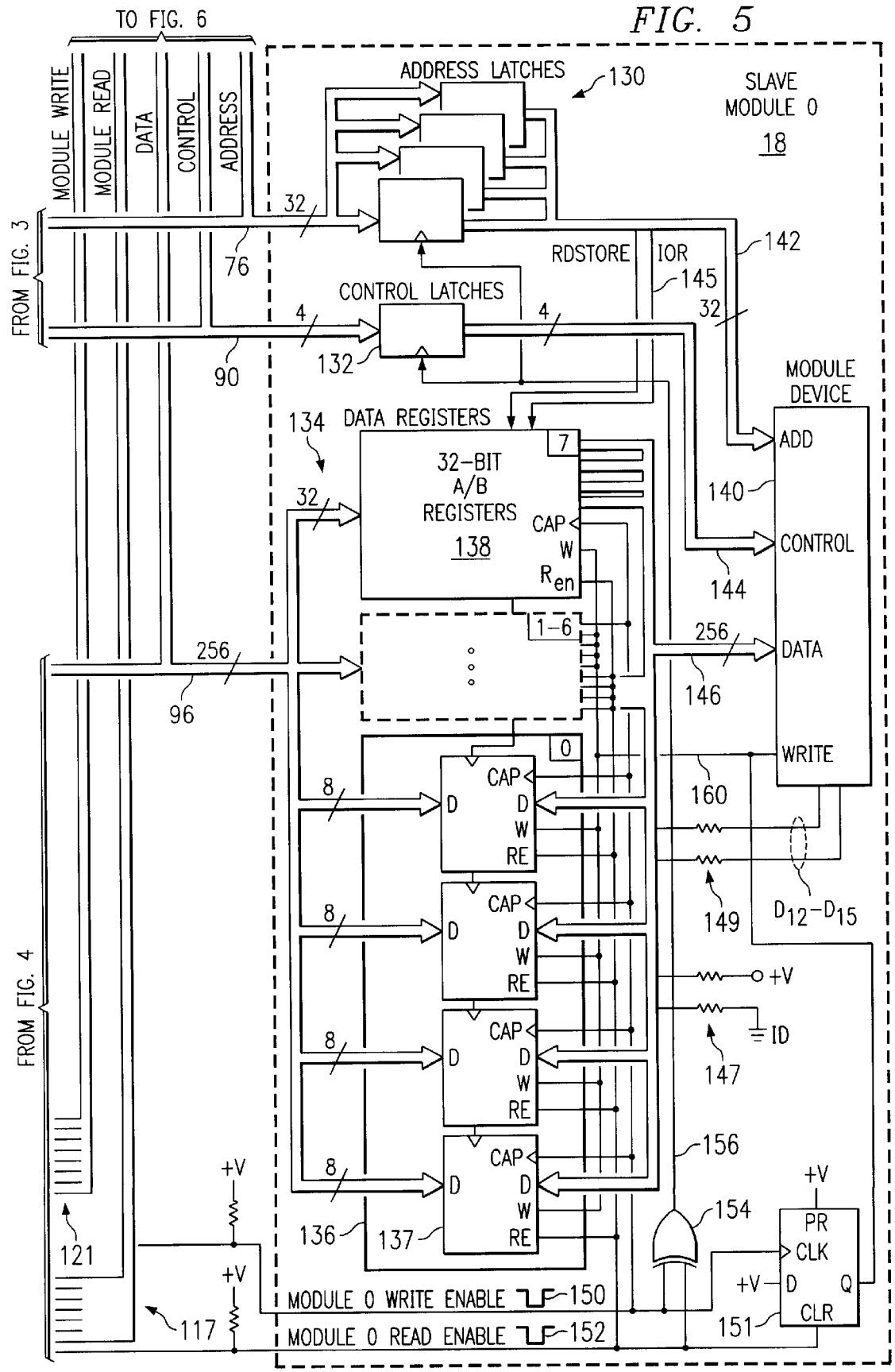
FIG. 5 is a detailed diagram of the slave bus latches and registers controlled by the processor to function with the slave modules.
Figure 6:
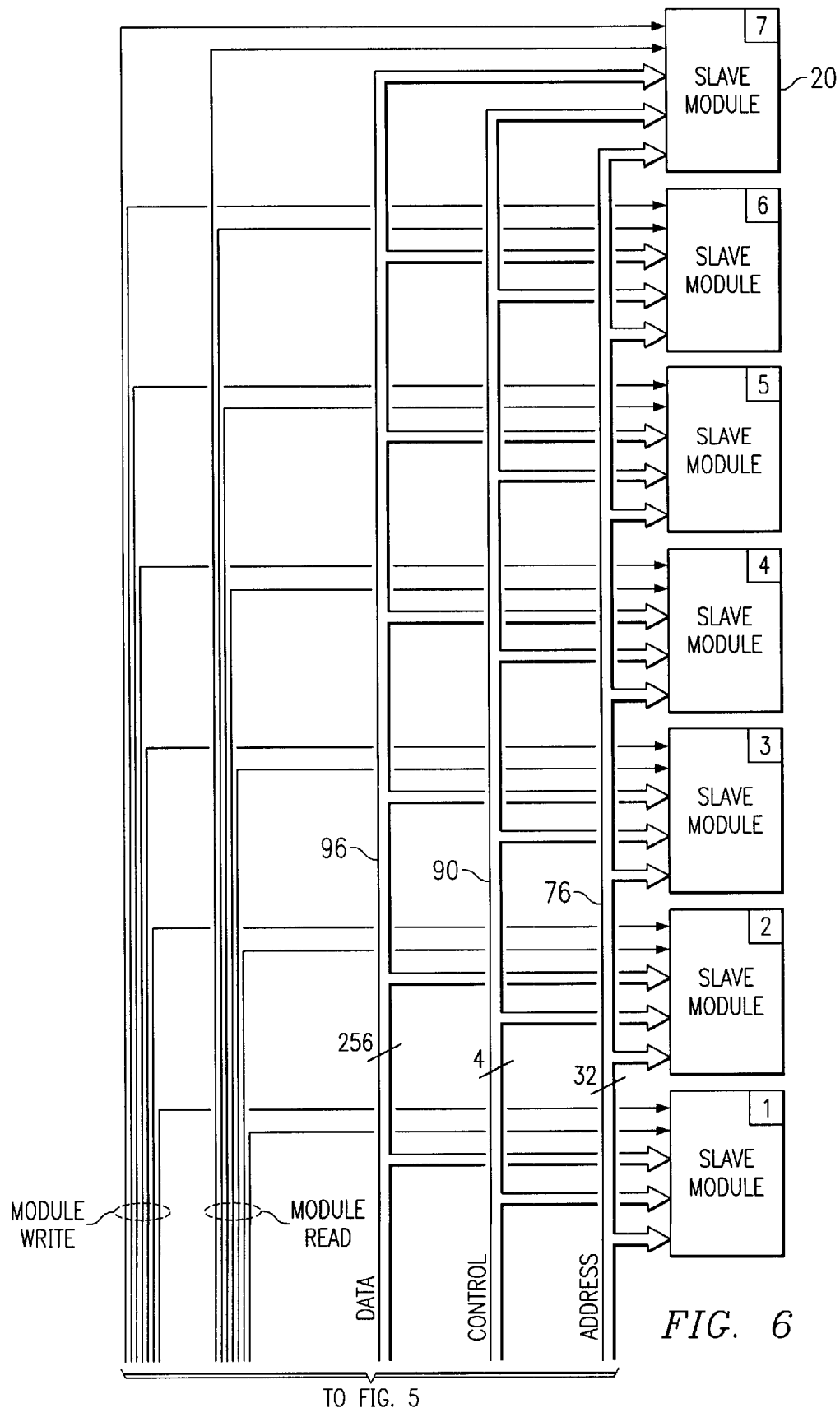
FIG. 6 is the extensions of the various high bandwidth buses to other slave disk drive modules.

The 32-bit address bus 76 is coupled in parallel to the slave module 0 shown in FIG. 5, as well as to the other seven exemplary slave modules shown in FIG. 6. The 4-bit control signal bus 90 is coupled in parallel to the slave module 0 in FIG. 5, as well as to the other seven modules shown in FIG. 6. The address bus 76 and the control signal bus 90 are unidirectional, directed from the processor 16 (master) to the slave modules. The 32-bit bidirectional data bus 50 output by the digital signal processor 16 on the global bus 26 is coupled to the eight groups of data registers 58 shown on FIG. 4.

Processor Data Registers and Control Circuits

With regard to FIG. 4, there are shown the eight groups of data registers 58 that operate bidirectionally, in that the digital signal processor 16 can transfer data to be stored in the registers 58 during a bus write operation, and can receive data from the registers 58 in response to a bus read operation. Eight groups of thirty-two registers are shown in FIG. 4 as reference numeral 90, with four integrated circuits in a group. Four 8-bit integrated circuit registers provide the storage capability of a total of thirty-two bits. Eight different bits of data are coupled to each integrated circuit 92 at a data I/O port thereof. It should be noted that the registers 92 are bidirectional transceiver and register devices that can couple data either to or from the processor 16. The data registers can be integrated circuits of the type SN74ABT652. The register group 90 is sufficient to latch thirty-two bits of data in a single processor cycle, as output on the 32-bit data bus 50 by the processor 16. There are seven other groups of master data registers in the preferred form of the invention, the last group shown as reference numeral 94. With eight groups of 32-bit data registers, a total of 256 data lines are available, as shown on the bus 96. With the processor 16 operating on only thirty-two bits of data, a total of eight processor cycles are required in order to load and latch all of the master data registers 58. As will be described more fully below, on the clock cycle for the loading of the last group 94 of master data registers, all 256 bits are also transmitted on the data bus 96 to the slave modules and latched in the corresponding slave registers shown in FIG. 5.

Coupled to the processor 16 by way of bus 52, which carries address bits $A_0$–$A_2$, is a write decoder 98 and a read decoder 100. The processor read/write line 62 is coupled to both the decoders 98 and 100, as is the strobe 0 line 64. When the R/W line 62 is at a logic high, the write decoder 98 is enabled, and when the R/W line 62 is low, the read decoder 100 is enabled. The strobe line from the processor 64 is effective to produce an output pulse 102 from the write decoder when the R/W line is high, and produce an output 104 from the read decoder 100 when the R/W line is low. Address bit $A_{30}$ provides an enable signal for the circuits of the high speed bus 22 by enabling the write decoder 98 and the read decoder 98. Each decoder 98 and 100 has eight outputs that are decoded, based on the three address inputs. Each of the first seven outputs of the write decoder 98 are coupled to a different data register group, and more particularly to a clock input of each register of such group. The signal output by the write decoder 98 only latches the data from respective lives of the bus 50 into internal registers, but does not present the data as an output to the high speed bus 96. In view that only one output of the write decoder 98 can be active at a time, only one group of data registers can be clocked at a time. The eighth group of data registers 94 is not clocked by the write decoder 98 to temporarily store within the registers thereof, but rather the data then present on the respective lines of the processor data bus 50 are transferred in real time through the registers 94 on the eighth cycle of the processor clock 84. Importantly, during the eighth processor clock 84, the data stored in the data register groups 0–6 is also transferred to the high speed data bus 96. Accordingly, on the eighth processor clock cycle all 256 bits of data are simultaneously transferred to the slave registers 134. It is noted that the eighth output of the write decoder 98 is connected to a driver 118 which generates the signal MAXW, which places the 256 bits of data on the high speed bus 96. It will be described below more thoroughly that on the falling edge of the eighth block write enable signal 102 generated by the write decoder 98, all 256 bits are transferred to the slave data registers 134 (FIG. 5), and on the rising edge of the block write enable signal 102, the slave registers 134 latch the 256 bits of data therein.

The read decoder 100 has outputs similar to the write decoder 98, the first seven of which are coupled to a different data register group, and particularly to a read enable input of the respective data registers. Accordingly, since only one output of the read decoder 100 can be active at a time, only one of the eight groups of registers can be read at a time. The eighth output of the read decoder 100 is not only connected to the eighth data register group 94, but is also connected to a driver 112 that produces the MAXR signal for generating a slave module read signal. In view that each group of registers corresponds to thirty-two bits, thirty-two bits of data can be either written or read during a single processor clock cycle.

The processor clock signal 84 produced at the output of the inverter 63 (FIG. 4) produces a number of clock signals for clocking the master data registers 58, as well as other circuits. The clocking circuits shown at the bottom of FIG. 4 include a driver 112 that receives as an input thereof a signal whenever the eighth output of the read decoder 100 is active. The output of the driver 112 produces the MAXR signal which is coupled to one input of an OR gate 114, as well as to an output enable input of a slave read decoder 116. In like manner, another driver 118 receives as an input thereof a signal whenever the eighth output of the write decoder 98 is active, thereby producing an output MAXW signal that is coupled to the output enable terminal of a slave write decoder 120. The MAXW signal is also connected to the write enable input of each data register 92 shown in the data register group 90. In addition, the MAXW signal is connected to the write enable input of each of the other groups of the master data registers 58. Accordingly, by way of the MAXW signal, all groups of data registers 58 are enabled to drive the high speed data bus 96 at one time, but only one group of the eight groups of registers are sequentially selected by the write decoder 98. The read decoder 100 does not produce a clocking signal to each master data register of the eight groups, but rather provides a separate read enable signal 104 for each of the first seven groups. The MAXR driver 112 and the MAXW driver 118 are each enabled by a bus enable signal 86 which is the same signal that is connected to the Ready input of the digital signal processor 16.

The logical ORing of the MAXR signal and the processor clock 84 by gate 114 produces a capture clock signal that is coupled to the capture input of each register of the eight groups of master data registers 58. The capture signal allows all of the master data registers 58 to capture data received from the high bandwidth data bus 96 and present the data to the processor via the processor data bus 50. The output of the OR gate 114 also drives a capture input of the slave read circuit 116. The processor clock 84 itself drives the capture input of the slave write circuit 120. In the preferred embodiment, the slave read circuit 116 and the slave write circuit 120 are latches substantially identical to the address latches.

The address bits $A_{27}$–$A_{29}$ carried on bus 56 are employed as three inputs to a slave module select decoder 124. Based on the combinations of logic states comprising the three address signals, one of the eight outputs of the decoder 124 is enabled, while the other seven outputs remain disabled. The eight outputs 126 of the slave module select decoder 124 are coupled to the eight data inputs of the slave write latch 120 as well as the eight data inputs of the slave read latch 116. The enabled one of eight select bits input to both the slave write latch 120 and the slave read latch 116 are reproduced at the respective output thereof, when the MAXW signal is active (when writing), or when the MAXR signal is active (when reading). As noted above, the block write enable signal 102 is a 4–15 nanosecond signal, as is the block read enable 104. Essentially, one of the eight outputs of the slave write latch 120 is active to select one of the eight slave modules during a write operation, while one of the eight outputs of the slave read latch 116 is active to select one of the eight slave modules for a read operation. In accordance with an important feature of the invention, the selection of the slave modules is controlled by the processor 16, as well as the particular read or write operation to be carried out by the selected module. This is all transparent to the host computer 10.

Slave Module Bus Latches and Registers

The address bus 76, the control signal bus 90 shown in FIG. 3, and the data bus 96 of FIG. 4, as well as the eight select outputs of the slave write circuit 120, the eight select outputs of the slave read circuit 116 are all coupled to a plurality of slave modules, one module 140 of which is shown in FIG. 5. The buses are also continued or routed to the other slave modules as shown in FIG. 6. In the preferred form of the invention, eight slave modules are employed, but such number is not a limitation to the invention. Also, in the preferred embodiment of the invention, the circuits shown in FIGS. 3 and 4 constitute a controller module having three printed circuit boards integrated into a single modular, metallic case, with the bus outputs extended to the circuitry of FIG. 5 provided as multi-layer backplane conductors to each of the slave modules shown in FIGS. 5 and 6. The mechanical features of the module cases and the chassis are described in detail in U.S. Pat. No. 5,757,617, issued May 26, 1998, and entitled "Electronic Module Interconnection", and in a patent application entitled "Electronic Module and Chassis Arrangement", filed concurrently herewith, and identified by Attorney Docket No. 11394/01201, the entire disclosures of which are incorporated herein by reference thereto.

It is to be noted that the number of conductors in the address bus 76, the control signal bus 90 and the data bus 96 are purely arbitrary, depending upon the particular application to which the invention may be applied. Each application to which the invention is applicable may include fewer or more lines in the address bus 76 to accommodate the necessary addressability associated with the slave modules. In like manner, the number of control signal bits on bus 90 depends upon the number of control signals necessary to communicate an adequate number of commands between the digital signal processor 16 and the slave modules. The number of conductors in the data bus 96 also depends on the number of slave modules and the number of parallel data lines that each slave module can accommodate. For example, if the slave modules are 32-bit processors themselves, then for eight such slave modules, the data bus 96 would preferably be 256 bits wide. On the other hand, if the slave modules were 16-bit hard disk drive units, then for eight such modules, the data bus need only be 128 bits wide. There is no requirement that each of the modules be of the same type or provide the same function, and thus some modules may be 8-bit slave devices, 16-bit slave devices, 32-bit slave devices, etc., the mixed combination of which determines the size of the data bus 96. As can be appreciated, the invention disclosed by way of example is merely one embodiment, of which many variations thereof can be employed by those skilled in the art.

In FIG. 5, there is shown the typical circuits that may be employed in connection with a slave module 18. It is to be noted that each of the additional slave modules shown in FIG. 6, preferably includes substantially the same circuits, although this is not a requirement. The slave module 18 includes four groups of slave address latches 130 of the type substantially identical to the master address latches 66–72, shown in FIG. 3. The 32-bit address bus 76 includes eight conductors branched to each of the four slave address latches 130, thereby being capable of simultaneously latching all 32-bits of address information. The 32-bit address bus 76 is paralleled to each of the seven other slave modules shown in FIG. 6.

The 4-bit control signal bus 90 is coupled to slave control latches 132 to latch therein the control signals. The 4-bit control signal bus 90 is also paralleled to the seven other slave modules shown in FIG. 6.

The 256-bit data bus 96 is coupled to the eight groups of slave data registers 134. In the preferred form of the invention, there are eight groups of slave data registers, where each group includes four 8-bit individual registers. The slave data registers 134 are substantially identical in structure and operation to the master data registers 58. Each data register group accommodates 32 bits of the 256-bit data bus. The first group of slave data registers is shown as reference character 136 and the eighth group of slave registers is shown as reference character 138. Much like the address bus and the control signal bus, the data bus 96 is paralleled to each of the seven other slave modules shown in FIG. 6. With the foregoing arrangement, each slave module has simultaneous access to the address signals on bus 76, the control signals on bus 90 and the data signals on bus 96. In the preferred form of the invention, each module is generally not enabled simultaneously to respond to the control signal commands. Rather, the module select write signals on bus 121 and the select read signals on bus 117 select one of the eight modules to carry out either a read or write function. In practice, the select signals on the buses 117 and 121 are employed to control the high speed, high bandwidth bus 22 during read and write operations, whereas the commands on the control signal bus 90 actually control the slave module devices 140 as to reading or writing.

The output of each of the slave address latches 130 is coupled to a module device 140, such as a hard disk drive, by way of a 32-bit slave address bus 142. It is noted that the backplane address bus 76, as well as the slave module address bus 142 is a unidirectional bus, directed from the processor 16 to the module device 140. Another address line 145 is connected to a clock input of each slave data register 134. The output signals of the control latches 132 are also coupled to the module device 140 by a unidirectional slave control signal bus 144. The 8-bit output of each data register chip 137, of each of the eight slave data register groups, is coupled via a slave module data bus 146 to the module device 140. Like the backplane data bus 96, the slave module data bus 146 includes 256 bits, and is bidirectional so that data can be coupled in either direction between the module device 140 and the digital signal processor 16.

Coupled to the various data lines ($D_0$–$D_7$) are resistors 147 that are either pulled up to a supply voltage or pulled down to ground. The combination of pull-ups or pull-downs for each module is unique, thereby allowing the resistors to provide a unique ID code to the processor 16. In other words, when the module device is placed in a mode so that it does not drive the data lines, the processor can read the data lines ($D_0$–$D_7$) and retrieve the unique code for that particular slave module. Importantly, the resistor code is available only when the slave module is inserted into a respective chassis slot. When the slave module is removed, the resistors are also removed, as they are physically part of the module device. When a slave module has been removed, the respective data lines ($D_0$–$D_7$) are all pulled high by other bus pull-up resistors (not shown) and thus the code for that chassis slot is all ones. The all one code is interpreted by the processor as an indication that the chassis slot is vacant.

Other resistors 149 are coupled between the data bus lines and the module device itself so that other device information can be coupled from the module device 140 to the processor 60, via the data bus.

In general terms, the 32 bits of address information on the slave address bus 142 is provided to the module device 140 to define either a physical address, control signals or data to specify the manner in which other data on the slave data bus 146 is to be operated. The control signals on the slave control signal bus 144 operate to control the module device 140 as to the manner or function with which the module device is to perform, such as read, write, erase, program, etc.

While not shown, other variations of the invention may employ multiple data buses, each isolated from each other. In order to realize a high degree of flexibility, transceivers may be connected between each of the data lines of each of the isolated buses. With this arrangement, the transceivers can be software-controlled to connect the data lines of any one data bus to the data lines of any other data bus. The transceivers function very much like a cross-point switch controlled by the digital signal processor 16.

In contrast to the address bus 76, the control signal bus 90 and the data bus 96, all the module write enable signals on the bus 121 and the module read enable signals on the bus 117 are not all paralleled to the other slave modules. Rather, only one of the eight module write enable signals is coupled to a particular slave module, as is a module read enable signal. In this manner, the digital signal processor 16 can control the read and write operations of the high speed bus 22 in synchronism with the function of each of the plural slave modules. As shown in FIG. 5, the module$_0$ write enable signal 150 is only coupled to slave module$_0$. In like manner, the module$_0$ read enable signal 152 is only coupled to the slave module$_0$. Each of the remaining write enable signals on bus 121 is coupled to a separate slave module, as are the remaining read enable signals of bus 117.

With regard to slave module$_0$ shown as reference numeral 18 in FIG. 5, the write enable signal 150 and the read enable signal 152 are coupled to a two-input exclusive OR gate 154. As noted above, the write enable signal 150 and the read enable signal 152 may be anywhere from a 2–15 nanosecond active low pulse, depending upon the state of the art integrated circuits employed. Nevertheless, when either a write enable signal 150 or a read enable signal 152 is present, the output of the exclusive nor gate 154 produces a corresponding signal on line 156 which clocks both the slave control latches 132 and the slave address latches 130. This operation thus latches the address information on bus 76 into the slave address latches 130 and latches the control signal information on bus 90 in the control latches 132, irrespective of whether the operation is a module read or write operation. Such information appears at the output of the respective slave latches 130 and 132, and thus is available to the module device 140 for carrying out the particular operation. On the other hand, and with respect to the slave data registers 134, the module write enable signal 150 is coupled directly to a capture clock input of each transceiver register chip 137 of all of the eight 32-bit groups of registers. In this manner, the data that is then present on the data bus 96 is latched into the respective slave data registers 137 of the slave module 18. The module read enable signal 152 is also directly coupled to each slave module data register chip 137, and particularly to the read enable inputs thereof.

In order to provide a specific write signal to the module device 140, a flip-flop 151 is provided. The module write enable signal 150 clocks the flip-flop 151, while the read enabler signal 152 clears the flip-flop 151. The data input of the flip-flop is held at a fixed logic high, thus providing a logic high on the Q-output when clocked. Accordingly, every time the flip-flop 151 is clocked with a write enable signal 150, the write input 160 of the module device is driven to a logic high level. When the read enable signal 152 is driven to an active low, the write input 160 of the module device 140 is driven low. The Q-output of the flip-flop 151 is also coupled to the write input of each of the slave data registers 134. When such input is driven high, due to the appearance of the write enable signal 150 clocking the flip-flop 151, the data stored in the slave registers 134 is transferred to the slave module device 140 via the slave data bus 146.

As used herein, the designation "write" generally means to transfer data from the digital signal processor 16 to one or more of the slave modules. The term "read" generally refers to a transfer data from one or more of the slave modules to the digital signal processor 16. As noted above, during the write operation of, for example, the slave module$_0$, the module write enable signal 150 is selected and pulsed low and then high. The rising edge of the pulse 150 latches address information in the slave address registers 130, latches signal control information in the slave control latches 132, as well as latches 256 bits of data in the slave data registers 134. The pulse width of the module write enable signal 150 provides a sufficient delay for the signals to propagate across the lines of the high speed, high bandwidth bus 22. As noted above, the module write enable signal 150 is coupled to slave module$_0$, and more particularly, only coupled to the capture clock inputs of each data register chip 137 of the slave data registers 134. In this manner, the data that is presently on the bus 96, is individually latched and stored within the respective data registers 137. In accordance with an important feature of the invention, the module device 140, which may be a processor, a hard disk drive, etc., may not operate as fast as the digital signal processor 16. Thus, since the address, control signal and data information is latched and readily available to the module device 140, such device need not operate either synchronously or as fast as the digital signal processor 16 in order to respond thereto. Rather, when the module device 140 receives the control signals to specify what action is to be taken, based upon the address, control and data information, such function can be carried out by the device 140 by transferring the latched address and data information thereto, and processing the same based on the command specified by the control signals. In due course, the module device 140 can respond by transferring the requested data to the slave registers 134 to be latched therein. The processor 16 can then obtain such data by transferring the slave register data to the master registers, and therefrom to the processor 16 itself.

More specifically, if the command designated by the control signals is a read operation in which the module device 140 is to supply data to the processor 16, then the module device 140 carries out such command and produces data on the slave data bus 146. Also, the module device 140 produces a write signal on line 160 so that each of the slave data registers 134 latches therein the data then on the slave data bus 146. The processor 16 can periodically check the status of the slave module after a read command has been issued to determine when the slave device 140 has latched the read data in the slave data registers 134. Thereafter, a module read enable signal 152 is directed to the slave modules, the read enable inputs of each of the slave data registers 134 is clocked, thereby transferring the data stored therein to the high speed backplane data bus 96. As noted above, the bus 96 is a bidirectional data bus which also couples data from the slave modules to the digital signal processor 16.

From the foregoing, it can be seen that the processor 16 can be programmed to control the loading of the master address latches, control latches and data registers, as well as the slave address, control and data registers. With this arrangement, a coordinated bidirectional and high speed transfer of large amounts data can be accomplished between the processor 16 and each of the slave modules without the processor 16 having to incur any wait states.

The lines of the slave data bus 146 each have a resistor 147 connected thereto and either pulled up to the supply voltage or grounded in a particular pattern that is unique to each module device. When the module 140 is removed from its slot in the chassis, the voltage across the resistors represent a unique code showing that module is not in the chassis. The digital signal processor 16 can read the resistor code via the data bus 96 and the data registers 134. This is important in detecting when a module device is removed by a user and later reinserted so that data previously written into a primary module device can be copied or mirrored to a corresponding copy module device. According to a feature of the invention, data is maintained duplicated in a primary and copy module device. A module identification in the nature of a code based on the pull-up or pull-down connection of the resistors 147 facilitates an automatic back-up of the data when the model device is again reinserted into the chassis.

While the preferred embodiment illustrates that the digital signal processor 16 controls the various buses, it may be advantageous in certain circumstances to utilize an ASIC controlled by the digital signal processor 16. When the ASIC receives high level commands from the digital signal processor 16 it produces corresponding address and control signals to achieve the specific commands. The use of an ASIC thereby reduces the signal processing requirements of the digital signal processor 16 to control and manage the various buses.

In accordance with another feature of the invention, the bidirectional transfer of data via the high bandwidth backplane bus 22 connecting the processor 16 and the slave modules can be accomplished utilizing a round-robin data transfer technique. The round-robin data transfer technique is especially advantageous when the slave modules are slower in speed than the processor 16, which in practice is normally the case when the slave modules constitute hard disk drives. Additionally, a partial zero delay data transfer can be utilized when the various disk drives operate at vastly different data transfer rates. For example, a high speed drive can be accessed multiple times for each time a slower speed disk drive is accessed by the digital signal processor 16. The speed of each module can be associated with the module identification code in the tables maintained in the software of the digital signal processor 16. Thus, the processor 16 can determine the specific sequence of accessing of the various module devices, based on module speed, to thereby optimize the operation of the system. During operation of the system when the disk drives are sequentially accessed and each drive is polled to determine when data has been loaded into the respective slave data registers 134, the processor 16 can determine the actual access time to each drive. Based on the actual access times of the various disk drive modules, the processor 16 can be programmed to modify the specific zero delay data transfer sequence. In practice, the manufacturer specifications of the disk drive access times is utilized to select a specific accessing sequence. Optimally, each disk drive has substantially the same access time and each module is accessed once driving each zero delay data transfer cycle. The elimination of processor wait states in the transfer of data more fully utilizes the full capacity of the processor 16 and reduces the time required for communicating data between the host system 10 and the slave modules. The processor 16 can be programmed in various different ways, including the carrying out of a round-robin transfer of data. The zero delay data transfer technique is especially well adapted for write operations, where large amounts of data are transferred from the host interface 28 to the slave modules, via the digital signal processor 16 and the high bandwidth bus 22. Prior to the read and write operations according to the invention, it is noted that the master address latches 66–72 can be clocked every processor clock cycle to transfer address information from the digital signal processor 16 to the slave address registers 130. As noted above, the processor address bus 54, the backplane address bus 76 and the slave address bus 142 are all unidirectional in practice for transferring address information in the direction only from the digital signal processor 16 to the slave modules. However, to provide a greater degree of flexibility, such buses could be constructed to be bidirectional.

With regard to the control signal latches 74 and 78, the control signal latch 74 functions to provide a full complement of addresses from the data bus 50 to the master address latch 72. The control signal latch 78 is clocked during the coincidence of a strobe signal during a write operation. Thus, unidirectional control signal information can be transferred from the digital signal processor 16 to the slave modules during every write operation. Because the data buses 50, 96 and 146 are bidirectional, the direction of data flow is controlled by the processor 16 by enabling either the write decoder 98 or the read decoder 100 via the read/write signal on line 62. During read operations data flows from the slave modules to the processor 16, and during write operations data flow occurs in the opposite direction. According to the bus architecture of the specific digital signal processor 16 identified above, a 31-bit address bus is provided at the global bus 26, which addresses can be generated in code internal to the processor 16 as a result of the programming thereof. In like manner, the specific processor 16 includes a 32-bit data bus provided as either an input or output to the global bus 26. The data provided on the global bus can be a function of the throughput of the processor, by way of the 32-bit data bus associated with the local bus 24. It is therefore possible for the high bandwidth backplane bus 22 to transfer address information and control information to the slave modules, while at the same time transfer data from the slave modules to the processor 16. Such an occurrence is typical when, for example, during a specific processor cycle, addresses resulting from read commands of the host system 10 are transferred to the slave modules for accessing data located at such address locations, while at the same time the slave modules are transferring data to the processor 16 as a result of a previous read operation. By accommodating the transfer of read operation signals in one direction and the transfer of data in the opposite direction on the high bandwidth bus 22, a higher degree of efficiency and throughput is indeed obtained.

As noted above, by utilizing integrated circuit decoders 98, 100 and 124, only a single slave module device is enabled at a time. There may be circumstances in which it is desired to simultaneously enable multiple slave modules so that, for example, two or more slave modules can be read or written at the same time. In this case, the same or different data can be simultaneously written to plural slave modules at the same time. In order to implement this simultaneous enabling of the slave modules, the decoders can be replaced with latches controlled by the processor 16 so that more than one latch output provides simultaneous enabling signals.

Processor Write Operation

In accordance with a write operation in transferring data from the digital signal processor 16 to one or more slave modules, a number of clock cycles are required. This is due primarily to the nature of the high bandwidth bus 22. In writing 256-bits of data, the eight groups of data registers 58 shown in FIG. 4 are sequentially loaded with data by the processor 16 and then transferred at the same time to the slave data registers 134 shown in FIG. 5. All eight groups of the slave data registers 134 are latched at the same time to capture the data from the backplane bus 96, thereby making bits of data available on the slave data bus 146 to the module device 140. In the preferred embodiment, the module device 140 can be sixteen-bit replaceable hard disk drive modules to accommodate the 256 bits of parallel data.

Figure 7:
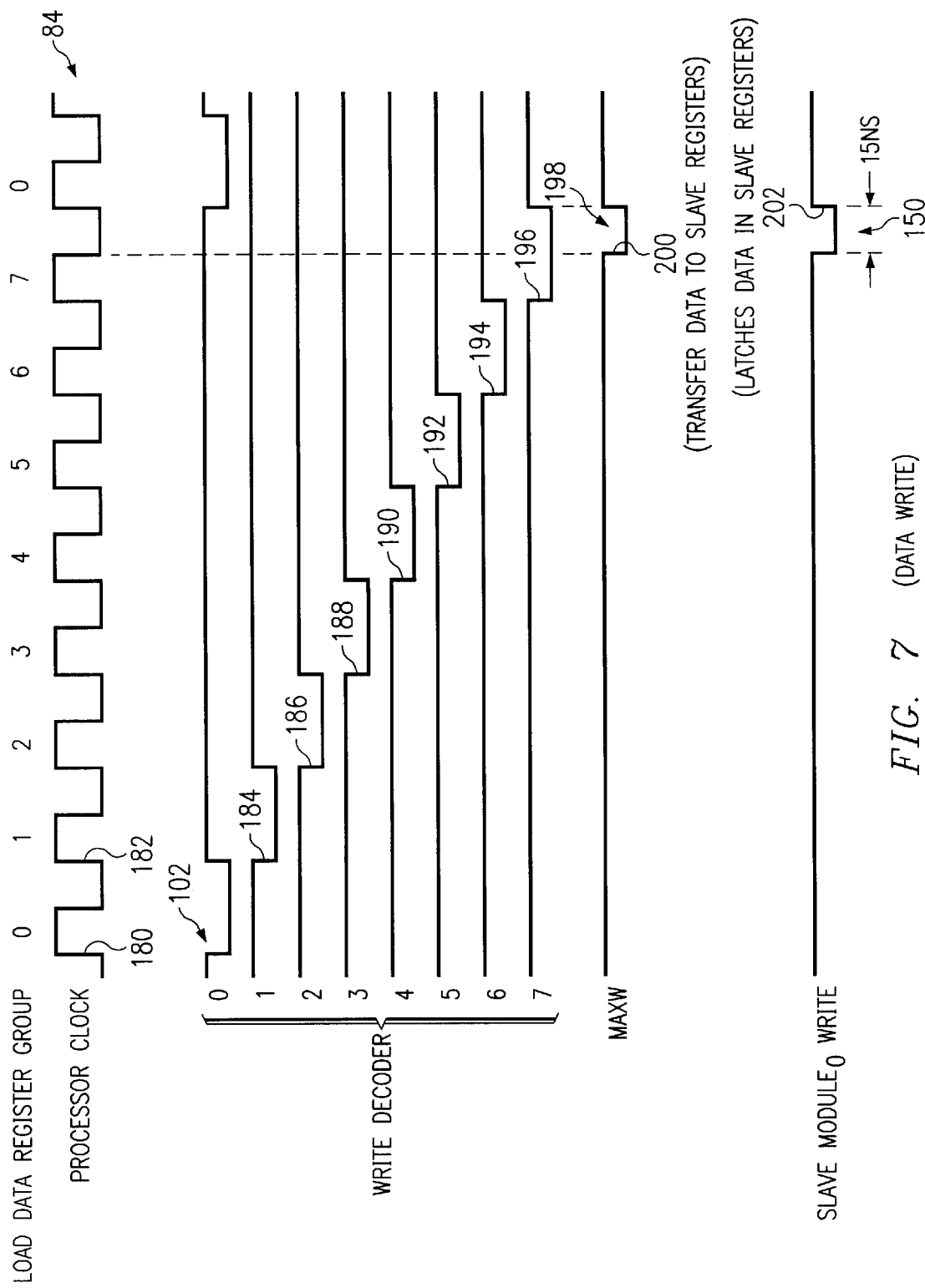
FIG. 7 is a series of waveforms illustrating a data write operation in transferring data from the processor to the slave disk drive modules.

With reference to FIG. 7, there are illustrated the various waveforms employed in writing data from the processor 16 to the slave module 140. Shown at the top of FIG. 7 are the numerical designations of the eight groups of master data registers 58, in association with corresponding clock cycles of the processor clock 84. As noted above, the cycle time for each processor clock is about 32 nanoseconds, whereby each half cycle is about 16 nanoseconds. The next eight waveforms show the output of the write decoder 98 that produces and output block write enable signal 102 in timed correspondence with the first cycle of the processor clock 84. During the initial portion of the first processor cycle identified by reference numeral 180, the processor 16 outputs 32 bits of data on the processor data bus 50, which data bus is coupled to the respective inputs of the master data registers 58. After the data bit signals have been set up, address bits $A_0$–$A_2$=000 output by the processor 16 on bus 52 are decoded by the write decoder 98, the write signal is produced on line 62, and the processor provides a strobe on line 64, thereby producing a block write enable signal 102 on the output corresponding to the states of the address signals $A_0$–$A_2$. The decoded output of the write decoder 98 is coupled to the first group (group 0) of master data latches 90, thereby clocking the first eight data bits therein.

During the second processor clock cycle 182, the processor 16 increments the addresses ($A_0$–$A_2$=001) on address bus 52 by one, and after the appearance of the processor strobe on line 64, the write decoder 98 produces an output signal 104 on its second output. The second output of the write decoder 98 is coupled to the second group (group 1) of master data latches (not shown), whereby the second eight bits of data are loaded therein. As the three address bits on bus 52 are sequentially incremented and the write decoder 98 strobed accordingly, five additional write decoder outputs are generated, designated by respective reference characters 180–194, whereby the third through seventh groups of master data registers are latched with data on the processor data bus 50.

The eighth group 94 of master data latches operates somewhat differently. When address bits $A_0$–$A_2$ are all logic ones, the write decoder 98 produces the eighth block write enable signal 196 which does not latch data in the eighth master data latch group 94, but rather generates the MAXW signal 198. It is noted that the MAXW signal 198 is substantially the same as the eighth block write enable signal 196, except for the delay through the driver 118. As noted in FIG. 4, the MAXW signal 198 is coupled to each write enable input of the master data latches 58, which signal transfers the data latched therein to the high speed data bus 96. In addition, the block write enable input of data latch group 94 is electrically connected to a fixed voltage. In other words, the eighth data latch group 94 is connected so as to produce a real-time transfer of bits 25–32 on the processor data bus 50 directly to the high speed data bus 96, without being latched within the latch group 94. On the falling edge 200 of the MAXW signal, all 256 bits of data are transferred from the processor side to the data lines of the high speed bus 96.

The high speed address bus 76, control signal bus 90 and data bus 96 are all paralleled to the multiple slave modules. Hence, the 256 bits of data transferred on the falling edge 200 of the MAXW signal 198 must be routed to a selected slave module that is to accept or receive the data. To that end, address bits $A_{27}$–$A_{29}$ on bus 56 are coupled from the processor 16 to the slave module select decoder 124 (or alternatively a latch) to select which one of the slave modules that is to be active, with respect to the data transferred on the high speed bus 96. It can be realized that according to the preferred embodiment, each slave module has a unique identity by virtue of the unique one-of-eight decoding of the three address bits $A_{27}$–$A_{29}$. The slave module select decoder 124 decodes the three address bits $A_{27}$–$A_{29}$ and applies the same to both the slave write circuit 120 and the slave read circuit 116. As noted in the diagram of FIG. 4, the processor clock signal 84 clocks the capture input of the slave write circuit 120, while the MAXW signal 198 produces a pulse on the slave write circuit 120 output that corresponds to the address decoded from the address bits $A_{27}$–$A_{29}$. While not a shown in FIG. 7, the MAXW signal 198 and the slave modules write signal 121 are delayed by the time it takes the signal to propagate through the slave write circuit 120. This delay may typically be a couple of nanoseconds.

With reference to FIG. 5, if the address bits $A_{27}$–$A_{29}$=000, then the module write enable signal 150 is generated and coupled to the slave modules, identified by reference numeral 18. As noted above, the modules write enable signal 150 is coupled to a capture clock input of each of the eight groups of slave data registers 134. On the rising edge 202 of the modules write enable signal 150, the 256 bits of data transferred on the high speed bus 96 are simultaneously latched into the 256 slave data registers 134 on the slave side of the high speed bus 22. The logic levels of the 256 bits of data are then available to the module device 140, on the slave data bus 146.

The foregoing illustrates the write operation of data from the processor 16 to the slave modules shown in FIG. 5. In the event that another module is to be written with the data, the processor is simply programmed to provide the appropriate address bits ($A_{27}$–$A_{29}$) on bus 56 and thereby select the appropriate slave module by virtue of the selection circuits 124 and 120. If several slave modules were to receive the same data, then the appropriate address bits on bus 56 would be sequentially produced to thereby latch the same data on the high speed bus 96 into the respective latches of the selected slave modules. As noted above, other types of decode or latch circuits may be employed to simultaneously enable two or more slave modules to thereby write the same data thereto. Indeed, programmable circuits such as ROMs, logic circuits, PLAs, etc. can be employed to achieve special enabling functions. On the other hand, the same slave module read and/or write line 117, 121 can be paralleled to plural modules so that such modules function together. Furthermore, during the transfer of data from the processor 16 to any one or more of the slave modules, address and control signals are correspondingly latched in the respective address latches 66–74 and the control latches 78 from the processor address bus 54 and data bus 50 and transferred on the high speed address bus 76 and control signal bus 90. Such signals are then latched into the slave address latches 130 and slave control latches 132 by the clock signal generated on line 156, as a result of the module write enable signal 150. The address and control signal information is thus presented on the slave buses 142 and 144 to the module device 140. Indeed, the transfer of address, control signal and data occurs simultaneously via the respective high speed buses 76, 90 and 96. This transfer across the high speed backplane bus 96 takes place well within 15 nanoseconds or less, which is the pulse width of the MAXW signal 198, as well as the pulse width of the slave module write enable signal 150.

It is also significant to note that in transferring data on the high speed data bus 96 from the master data registers 58 to the slave data registers 134, the MAXW signal 198 must be generated. The MAXW signal 198 is generated only when the eighth output of the write decoder 98 is active, namely, when address bits $A_0$–$A_2$=111. In order to efficiently transfer data, it is thus advantageous to employ the eighth data registers group 94 as the 32 bits of data to be transferred. The reason for this is that with the generation of address bits $A_0$–$A_2$=111, the MAXW signal 198 is also generated and thus the data bits $D_{25}$–$D_{32}$ on the processor data bus 50 are transferred in real time directly through the eighth register group 94 to the high speed bus 96. In the event 64 bits of data are to be transferred, then any of the other data register groups 0–6 can be selected for the first 32 bits, and the eighth data group 94 must be selected for the remaining 32 bits, thereby producing the requisite 64 bits to be transferred on the high speed data bus 96. As can be appreciated, the data sequentially loaded in any of the eight groups corresponds to the sequence of the generation of the three addresses $A_0$–$A_2$ on bus 52 by the processor 16.

Processor Read Operation

The reading of data by the processor 16 is entirely under control of the programmed operation of the processor. In the preferred form of the invention, data transferred from a slave module device 140 is generally in response to a previous request, although this is not a requirement. The reading of data from a slave module device 140, especially if it is a hard disk drive module, is accomplished by transferring a read command by way of signals on the control signal bus 144 and address by way of the address bus 142 to identify the type of operation and to denote the address or addresses at which the data is located. After some time delay determined by the access time of the module device 140, data will be read from the buffer RAM of the hard disk drive module and placed on the slave data bus 146. As noted above, the processor 16 can interrogate the status of a prior request by way of the control signal bus 144, whereby the module device 140 can respond on the data bus in acknowledgment of the status request. If the device module 140 signifies that the data requested is ready, the processor 16 can carry out the following operations to transfer the data from the slave module device 140 to the processor 16. In the example described above, data requests are most typically generated by the host system 10 and communicated to the processor 16 by way of the SCSI bus 14. Moreover, data to be written into the module device 140 is also communicated from the host computer 10 to the processor 16 by way of the SCSI bus 14. Inherent in the read and write operations described herein is the reformatting of the data and/or requests in the SCSI format for transfer from the processor 16 to the host system 10.

Figure 8:
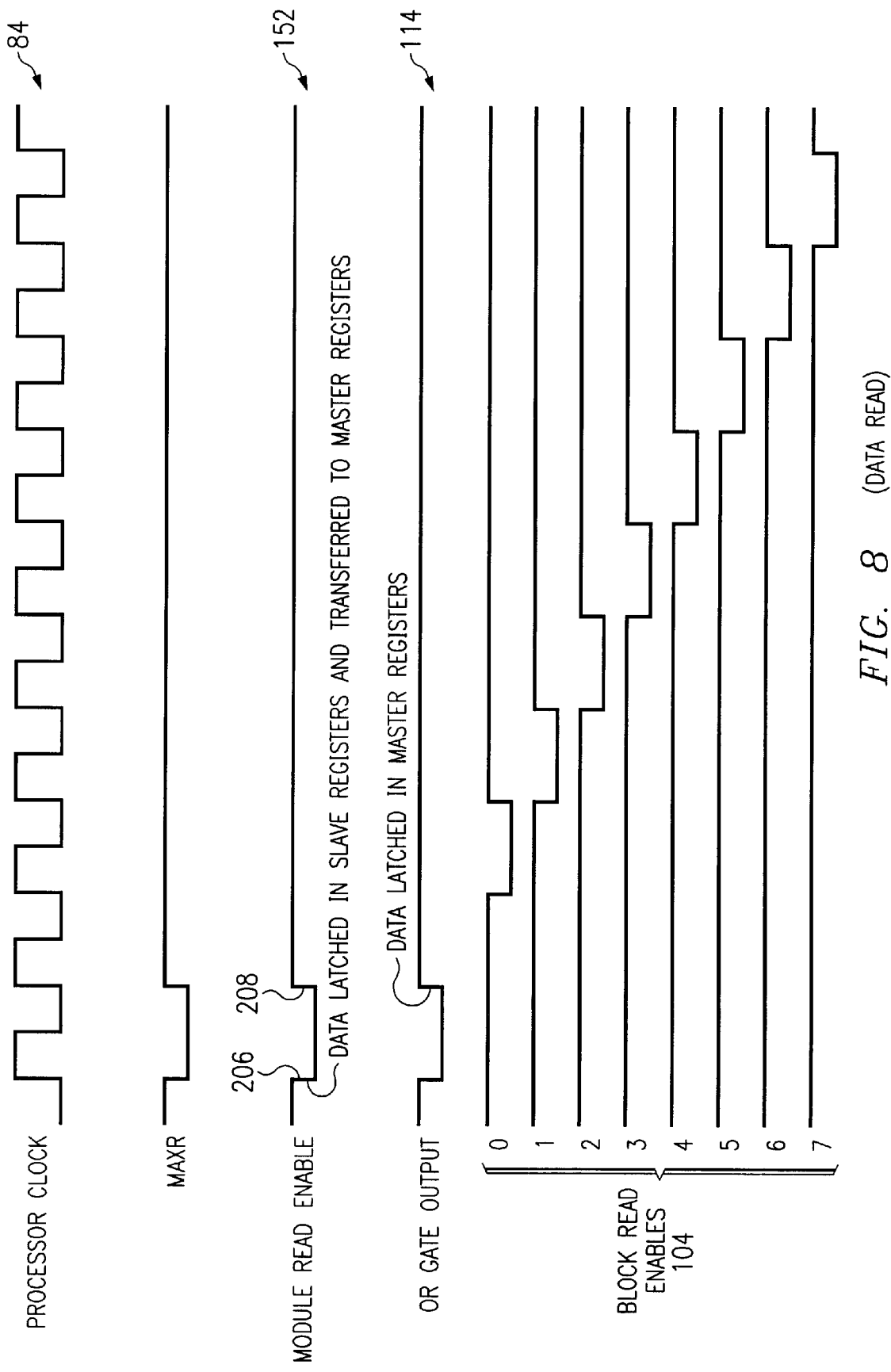
FIG. 8 is a series of waveforms illustrating a data read operation in transferring data from the slave disk drive modules to the processor.

Returning to the read operation, as shown by waveforms in FIG. 8, when data is ready to be transferred from the slave module device 140 to the processor 16, the appropriate address signals $A_{27}$–$A_{29}$ are generated by the processor 16 on the module select bus 56. The one-of-eight outputs of the slave module decoder 124 are provided on the bus 126 to the slave read circuit 116. In addition, the address bits $A_0$–$A_2$ presented by the processor 16 on bus 52 are decoded by the read decoder 100, and in response to a processor read signal on line 62 and a strobe on line 64, the eighth output of the read decoder 100 becomes active, thereby generating the MAXR signal, via driver 112. The MAXR signal enables the OR gate 114. The processor clock 84 thereby provides a signal to the capture input of the slave read circuit 116, thereby producing the output module read enable signal 152 directed to the slave modules, identified by reference numeral 18. At the same time, the processor 16 can load the address registers 66–74 and the control registers 78 for transfer of such information via the high speed buses 76 and 90 to the corresponding slave latches 130 and 132. The address and control signals transferred via the respective buses need not be related to or coordinated with the slave read signal generated by the slave read circuit 116. In any event, and with regard to FIG. 5, the module read enable signal 152 allows the data from the module device 140 to be loaded into the slave data registers 134. Further, at the same time the module read enable signal 152 allows the address and control signals from the high speed buses 76 and 90 to be latched into the respective slave address latches 130 and the slave control latches 132.

On the falling edge 206 of the module read enable signal 152, the data present on the slave data bus 146 is latched into the slave data registers 134. On the rising edge 208 of the module read enable signal 152, the data that is stored in the slave data registers 134 is coupled to the high speed bus 96. After a propagation delay time for the data to be presented to the master data registers 58, such data is ready to be latched therein on the processor side of the backplane bus. It is assumed that a full 256 bits of data have been transferred on the high speed bus 96. Prior to or during the initiation of the read operation, the processor 16 provides the appropriate address $A_0$–$A_2$=000 on bus 52, provides a read signal on line 62, and then strobes line 64. Once the 256 bits of data have been latched into the master data registers 58, the processor 16 then ripples in an up count manner through the addresses $A_0$–$A_2$ while strobing the read decoder 100 at each address, whereby the eight outputs of the read decoder 100 are sequentially activated to generate the respective eight block read enable signals 104, as shown in FIG. 8. The signals 104 sequentially clock the eight groups of master data registers 58. During each sequential read operation by the processor 16 in rippling through the eight addresses ($A_0$–$A_2$), thirty-two bits of data are transferred, one group after the other, from the master data register groups to the processor data bus 50. After the generation of eight strobe signals on line 64, and after having sequenced through the eight addresses on bus 52, the processor 16 sequentially receives the eight 32-bit groups of data at the global bus 26, via the processor data bus 50. The processor 16 can then process the data or otherwise transfer the data in appropriate bytes to the SCSI host interface 28, where such data is formatted according to the SCSI protocol.

The processor 16, of the type noted above, is a digital signal processor programmed with assembly language code to carry out the read and write operations set forth above. Appendix A attached hereto constitutes the machine language instructions as well as the mnemonic code for writing an exemplary 64-bit segment of data. As noted herein, this segment of data relates to two blocks where each block of data constitutes 32 bits. Accordingly, two processor operations are repeated to transfer 64 bits of data from the slave module to the processor 16 via the high speed backplane data bus 96. With regard to Appendix A, the first column of numbers are line numbers of the software instructions. The second column of alpha-numeric symbols represents a hexadecimal 32-bit physical memory address, whereas the third column represents in hexadecimal form the machine code instructions that reside at the address. The fourth column of the table is the mnemonic command or instruction. For example, "LDI" represents a load instruction, the mnemonic "OR" represents a logical ORing function, "ADDI" represents an add instruction and "STI" represents a store instruction. The fifth column is the operand of the instruction and the sixth column contains the comments concerning the instruction. Each instruction is generally carried out in a single processor cycle, i.e., within 32 nanoseconds, with the exception of the four dual instructions near the bottom of Appendix A that are associated with vertical parallel lines, where both such instructions are carried out in a single processor cycle. For example, in lines 4840 and 4841, the load instruction and the store instruction are carried out in a single processor cycle.

With specific reference to the software listing of Appendix A, the first five instructions initialize the various processor registers to carry out two dummy read operations. The two dummy read operations are necessary in order to transfer valid data from the slave data registers 134 to the master registers 58, and then to transfer the data from the master data registers 58 to the processor 16. It is noted in lines 4818 and 4821 that the base address of the high speed bus 22 is identified as a 9-character hexadecimal number, defined primarily by address bits $A_{31}$–$A_{30}$. The slave module 2 of the eight possible modules is identified with an offset address of another hexadecimal number, defined primarily by address bits $A_{27}$–$A_{29}$. The particular offset into the module, i.e., the memory address of the module, is defined by the hexadecimal number 2000h.

In the first instruction, e.g., "LDI" at line 4823, the instructions specify the loading in the address register AR1, the second module base address which is to be ORed with the offset address of slave module 2. The actual arithmetic OR function is set forth in the second instruction. The third instruction transfers the offset of the address from the first address register AR1 to a second address register AR2. In the fourth instruction, the number 7 is added to the second address register, which address points to the last data block, i.e., slave module 7 which is associated with address $A_0$–$A_2$=111. In the fifth instruction, which is a load "LDI" instruction, the index register is employed to increment the address register. With these instructions, the address register is incremented between AR1=010 and AR2=111. These addresses essentially toggle between the reading of the second 32-bit group of master data registers shown in FIG. 4 and the eighth 32-bit data group 94, namely data block 2 and data block 8.

As noted in the comment of line 4831 of the software of Appendix A, the next four load instructions, when carried out by the processor 16, execute two dummy read operations to transfer valid data from the two slave modules to the master data registers 58. It is noted that there are no corresponding store instructions (STI) associated with the four load instructions, as the data transferred in accordance with the two dummy read operations is not the valid data requested pursuant to the read operation, and thus the processor 16 does not store or otherwise maintain the data of the first two dummy read operations. In the load instruction associated with line 4832, the 32 bits of block 0 data are loaded into the master data register block 0. In accordance with the load instruction of line 4833, the 32 bits of data of block 7 are transferred from the data bus 96 directly to the processor 16, and the 32 bits of data from block 0 are also transferred from data block 0 to the processor 16. As noted above, a data transfer from the master registers 58 to the processor 16 occurs only when the eighth output of the read decoder 100 is active, i.e., when $A_0$–$A_2$=111. As noted in the comment of line 4838 of the software printout, the four following pairs of instructions transfer valid data to the processor 16. In contrast to the two dummy load operations, each subsequent load operation in which valid data is transferred, is accompanied by a store (STI) operation. Also, from the initialization of the registers of the processor 16, it is noted that register AR1 was loaded with the address bits $A_0$–$A_2$=000 and register AR2 was loaded with the address bits $A_0$–$A_2$=111. It is further noted that the 32-bit address register AR4 stores the data from each data block, and in the same processor cycle stores the data in a processor buffer memory or RAM associated with the processor global bus 26. While not apparent, it is further noted that during the load instructions corresponding to lines 4843 and 4849, two blocks or groups of data (64 bits) are transferred from the slave data registers 134 to the master data registers 58. During each of the four processor cycles noted by the vertical parallel lines of Appendix A, 32 bits of data are sequentially transferred from the master data register groups 90 and 94 (data block 0 and data block 7).

Those skilled in the art may employ similar instructions for carrying out write operations in transferring data from the processor 16 to the slave modules, via the high speed bus 22. However, in a write operation, no dummy reads or writes are employed, and the load and store instructions would be reversed so that a store instruction is effective to load 32-bits of data from the processor 16 to a group of master data latches, and a load instruction is effective to actually latch the data in the respective group of master data latches. Also, rather than toggling between two addresses of $A_0$–$A_2$, other combinations can be employed, and indeed all eight addresses can and will often be sequentially produced to activate all eight groups of data registers, thereby providing a full transfer of 256 bits of data. To achieve full efficiency of the high speed bus 22, a round-robin data transfer technique is preferably employed to utilize all eight groups of master data registers, as well as utilize plural slave modules.

The foregoing describes the preferred embodiment in which the data bus 96 exclusively carries data to and from the slave modules 140. In an alternative embodiment, the data bus 96 can also carry control signals to the slave modules, as well as data. For example, the processor 16 can be programmed to provide actual data on some data lines directed to a slave module 140, and to provide control signals on other data lines. If, for instance, 32 bits of the data bus 96 are directed to a slave module, sixteen of the bits can be used for carrying actual data for the slave module, and the other sixteen bits can be used for control signals to control the slave module. Indeed, the data bus can also be used to carry address and other types of signals to and from the slave modules.

Zero Delay Data Transfer

Figure 9:
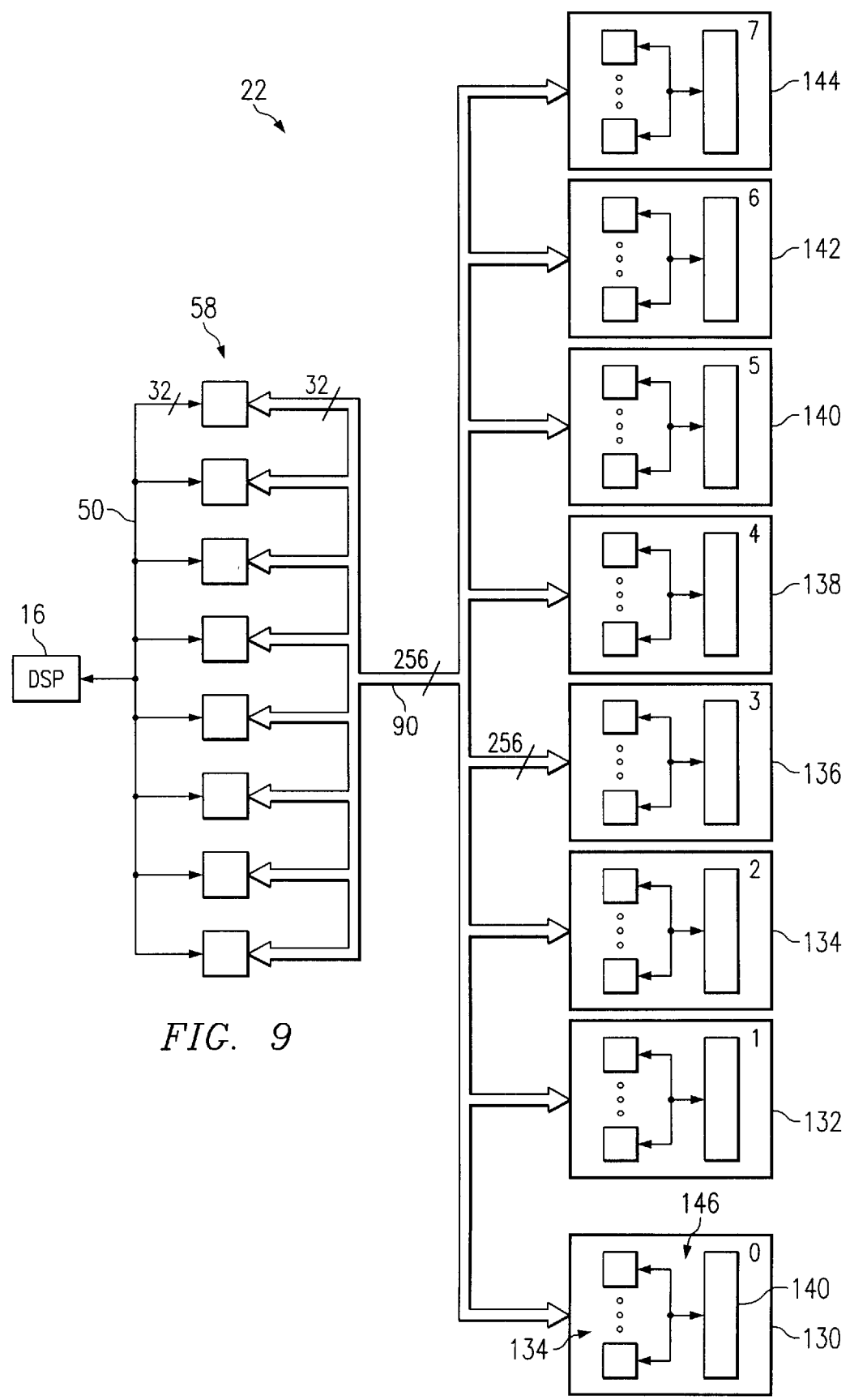
FIG. 9 is a generalized block diagram illustrating the high speed wideband bus connecting the processor to multiple slave modules for carrying a zero delay transfer of data.

FIG. 9 illustrates in general block diagram form a fully utilized system efficiently employing the zero delay (round-robin) data transfer technique. It should be noted that the system of FIG. 9 is shown for example purposes only, it being realized that other systems may have more or fewer of the components, buses, etc., depending upon the particular situation. The zero delay data transfer technique is well adapted for systems where the speed of the slave devices is slower than the processor.

The system of FIG. 9 is substantially the same as that described above, having a high speed processor 16 coupled to eight groups of 32-bit master registers 58 by a 32-bit bidirectional data bus 50. Each group or block of master data registers 58 is coupled by respective 32-bit output buses which, when combined together, form a 256 bit high speed bus 90. The slave end of the high speed bus 90 is paralleled to eight slave devices identified by numerals 130–144. Each slave device has eight groups of 32-bit slave data registers 134 coupled by a 256 bit bus 146 to a respective slave device 140. Although the address and control signal buses and corresponding latches are not shown, such circuits are implied in the operation according to the following. Further, although the address and control signal buses are described herein as being unidirectional, a wide variety of system applications exist in which such buses may be bidirectional, much like the data bus described herein.

In the following, it is assumed for purposes of example that the processor 16 is a 33 megahertz machine driven by a 30 nanosecond clock signal. For each cycle of eight clock signals, 32 bits are loaded into the corresponding blocks of master data registers 58. On the eighth clock cycle, the eight groups of 32 bits (256 bits total) are transferred along the 256 bit data bus 90 and presented to the storage registers of each of the eight slave modules. In accordance with the preferred embodiment of the invention, one slave module, such as slave module 130, is enabled, whereby all 256 bits of data are latched into its slave data registers 134. Once latched into the slave data registers 134, the slave device 140 can begin storing or otherwise utilizing the 256 bits of data by way of the slave data bus 146. Assuming, for example, that the slave device 140 comprises sixteen 16-bit hard disk drive modules, two disk drives can utilize data from one 32-bit slave data register group. It is further assumed for purposes of example, that if it takes a hard disk drive about 1.92 microseconds to obtain the data and store it on a respective disk, the system can nevertheless accommodate such a high speed data storage device.

After loading and transferring the first 256 bits of data, the processor 16 then continues from the ninth clock cycle through the sixteenth clock cycle to again sequentially load the master data registers 58 with data and transfer the data sequentially to the next slave module 132, where such data is latched in the slave data registers thereof. This process continues to take place in a repetitive manner, transferring groups of 256 bits of data to the remaining slave modules 134 through 144. After about 1.92 microseconds, the processor 16 has transferred 256 bits of data to each of the eight slave modules. As noted above, if, for example, each slave module ideally requires about 1.92 microseconds to process 256 bits of data, then after the first sequence of data transfer, and after eight additional clock cycles in which the master data registers 58 have again been sequentially filled with data, the first slave module 130 has processed or otherwise stored the previous data and is ready for more. In the example, the loading of the master data registers 58 and the transfer of eight groups of 256 bits of data requires a total time of about 1.92 microseconds, and with an additional eight clock cycles to again load the master data registers 58, a total of about 2.16 microseconds has elapsed before the first slave module 130 can receive additional data. This data transfer rate corresponds to about 1.06 gigabits of data per second. It can be appreciated that a cyclical zero delay data transfer operation will seldom be realized, due primarily to the fact that a full zero delay transfer cycle will be about equal to the processing time of a single module. Nevertheless, in carrying out a single or partial zero delay transfer cycle, the processor 16 need not wait for the response or acknowledgment of each slave module before proceeding to the next module. By eliminating the wait states involved by the processor 16, the processor time is better utilized, and the system as a whole operates faster and more efficiently.

The zero delay data transferral technique can operate in the reverse manner, namely, the transferring of data from the slave modules to the processor 16. According to a read zero delay data transfer technique, each of the slave modules can load the slave data registers 134 with data, whereupon the 256 bits thereof are transferred and stored in the master data registers 58. The digital signal processor 16 can then sequentially download each block of 32 bits from the master data registers 58 and transfer such data to a host system, or the like. Once all of the master data registers 58 have been downloaded, the next slave device 132 can then transfer 256 bits of data to be latched in the master data registers 58. This sequence can be continued throughout all slave modules to achieve a high speed transfer of data to the processor 16. As can be appreciated, this technique is especially well adapted for use when a high speed processor is transferring data to or from a number a of slower speed peripherals.

Multiple Processor Arbitration

Figure 10:
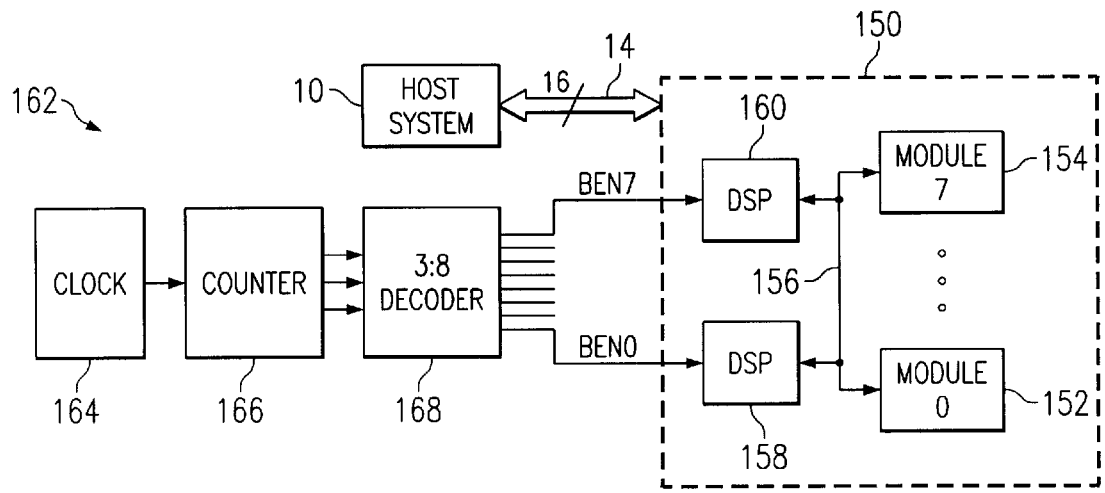
FIG. 10 illustrates a system in which plural digital signal processors operate with one zero delay data transfer bus, in coordination with an arbitration circuit.

With regard to FIG. 10, there is illustrated another arrangement of a data processing system. In this system, there is shown a host computer system 10 operating with a data processing system 150 having a plurality of slave modules 152–154 coupled by a bidirectional data bus 156 to plural digital signal processors, two of which are identified by reference numerals 158 and 160. The high speed bus includes master address, control signal latches and data registers, as well as slave bus devices, much like that described above. In this embodiment, an arbitration circuit 162 is employed to coordinate the access cycles of each processor to the high speed data bus 156. The arbitration circuit 162 includes a clock circuit 164 driving a counter 166, and the outputs of the counter are decoded by a 3:8 decoder 168. For each signal level decoded from the three inputs of the decoder 168, only a single one of the eight outputs is active at a time. Each output is identified as bus enable signal (BEN) 0–7. With eight bus enable signals, eight possible processors can be coordinated for using the data bus 156 of the data processing system 150. Preferably, the clock 164 operates no faster than the clock cycle of the digital signal processors. Moreover, the bus enable signal from the arbitration circuit 162 is coupled to a "ready" or similar input of each digital signal processor. In this manner, each digital signal processor is only active for using the bus when the bus enable signal is active, thereby allowing individual access of such processor to the data bus 156. The arbitration clock 164 can have a cyclical period such that when the various processors are enabled, they can carry out a specified number of instructions or clock cycles. An important advantage of the arbitration circuit 162 is that it maintains the processors synchronized so that no operational overlapping occurs with respect to the use of the data bus 156.

Figure 11:
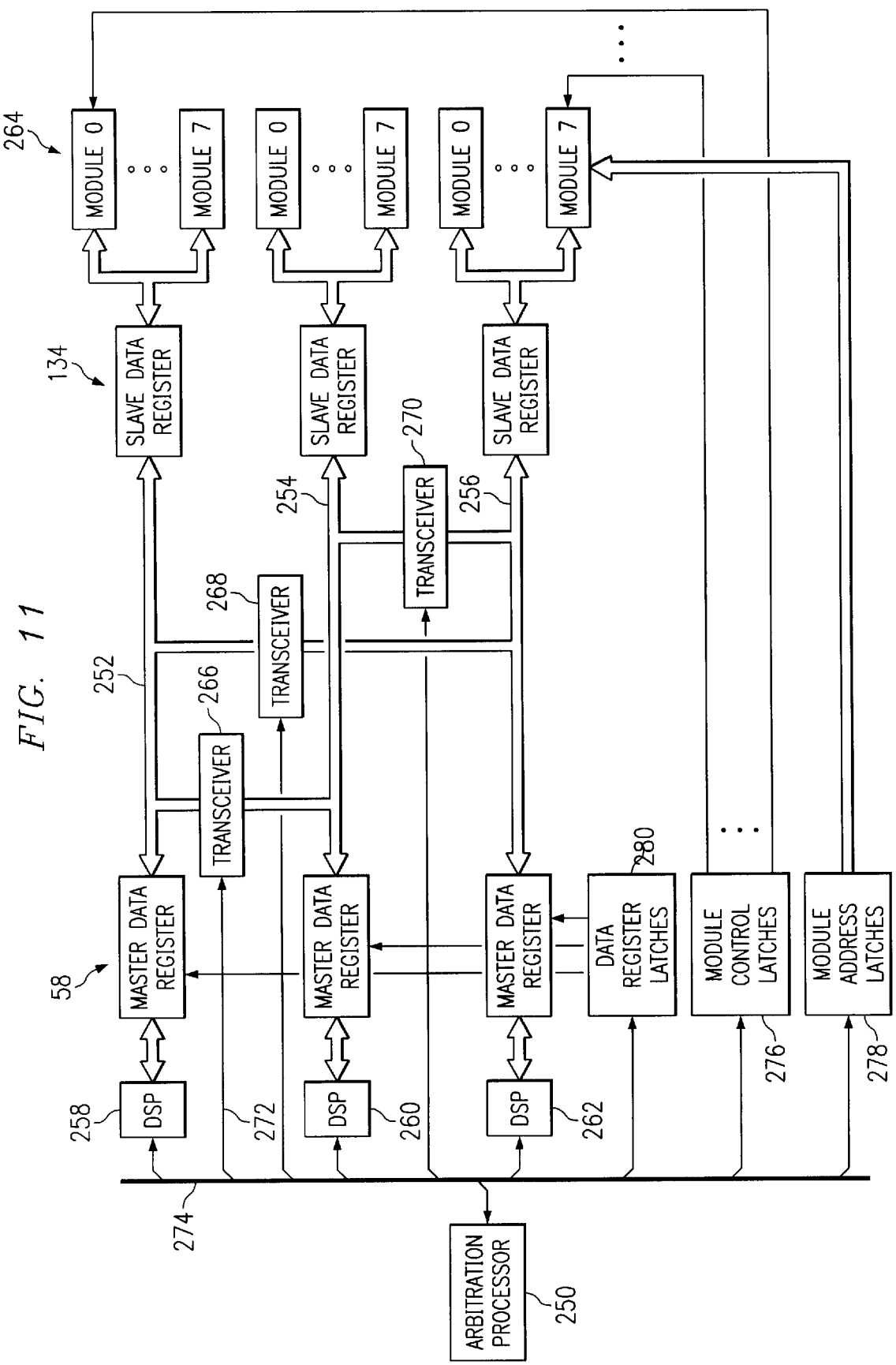
FIG. 11 is a block diagram illustrating a high speed data delivery system that utilizes a separate processor to manage the zero delay data transfer buses which are interconnected together to increase efficiency.

FIG. 11 illustrates another embodiment of the invention in which a processor 250 is dedicated to the arbitration of the various data buses 252, 254 and 256 that couple data between a respective digital signal processor 258–262 and corresponding slave modules collectively denoted by reference numeral 264. A transceiver or data switch 266 is shown coupled between the data bus 252 and the data bus 254. Preferably, although not by way of necessity, a bidirectional transceiver can connect one bit line of a bus to another bit line of another bus. Moreover, it is preferable that the transceivers 266 are addressed or otherwise controlled so that only desired ones of the transceiver can be activated to connect any number of data lines of a bus to corresponding data lines of another bus, while leaving the remaining data lines of the buses isolated. With isolated buses, if a faulty drive or other circuit freezes some of the data lines to a locked logic level, the other isolated buses are not affected. In this manner the data lines can be time multiplexed to provide a high degree of flexibility in transferring data between multiple destinations.

In like manner, data transceiver 268 is effective to couple data between data bus 252 and data bus 256. Lastly, transceiver 270 is effective to couple data between data bus 254 and data bus 256. With this arrangement, data on any one bus can be coupled under the control of processor 250 to any other bus, much like the use of a cross-point switch. Each of the data transceivers is bidirectional and can either couple the bit lines of the buses together, or maintain such lines isolated for any period of time. The transceivers 266–270 are each controlled by the arbitration processor 250 by way of the control lines or buses, such as control lines 272.

Moreover, the arbitration processor 250 couples commands to the digital signal processors 258–262 such as by lines identified by reference numeral 274. In such type of a control architecture, the arbitration processor 250 can be programmed to respond to various commands from the host system 10 for transferring data from any one or more of the slave modules 264 to the host system 10. In addition, the arbitration processor 250 can forward high level commands via lines 274 to any one of the digital signal processors 258–262 to read data onto a bus from a disk drive module, and couple the data to another data bus by way of transceivers 266. In this manner, data can be read from one slave module and written into another slave module without substantial involvement by the digital signal processors. While not shown, there includes additional and dedicated address and/or control lines coupled between the digital signal processors and their respective slave modules, that are not shown in FIG. 11. With such an arrangement, the individual disk drives can be placed in different modes of operation at the same time to carry out different functions.

In the embodiment shown in FIG. 11, the various slave modules 264 are individually controlled by the use of latches 276 and 278. As noted above, rather than employing decoder circuits, latches can be utilized so that any one or more of the slave modules 264 can be individually or simultaneously enabled. The latches 276 are controlled by the arbitration processor 250 to provide control signals to the slave modules. The latches 278 are also controlled by the processor 250 to provide latched address signals to the slave modules. The latches 280 are also controlled by the processor 250 to provide latched control signals to the master data registers 58 on the processor side of the zero delay data buses 252–256.

The foregoing embodiment provides multiple data paths to multiple disk drives to simultaneously carry out different functions independently and simultaneously.

Processor Software

The digital signal processor 16 is a high speed processor that functions substantially independent of the host computer system 10. To that end, multicomputer processing of the same data is carried out. For example, the host computer system 10 operates in a traditional manner in conveying SCSI commands to the high speed data storage system 22, thinking that it is communicating with one or more disk drives via conventional disk drive controllers. Rather, the data storage system 12 of the invention receives the SCSI commands and processes the commands in accordance with the various routines programmed therein. Importantly, the processor is programmed to recognize and process FAT 16 type of files, and in so doing employs its own disk operating system programmed to control a high speed digital signal processor. Moreover, because the disk drives are duplicated and removable, the processor 16 must maintain a current and past status of each of the drives, as well as the status of the data stored therein.

The various routines are described in detail below and are attached hereto as respective appendices, as follows:

Appendix A—Example Read of a Disk Drive

Appendix B—Main Control Loop Routine

Appendix C—SCSI Interrupt Service Routine

Appendix D—Initialize Current Copy Drive Data Table Routine

Appendix E—Initialize Module Data Table Routine

Appendix F—Drive Information Table

Appendix G—Rebuild Copy Disk Drive
Appendix H—Get Module ID and Store it in DIT
Appendix I—SCSI Read Command
Appendix J—SCSI Write Command
Appendix K—Request Sense Command The digital signal processor 16 of FIG. 3 is programmed to operate in conjunction with the SCSI host interface 28. In doing so, the processor 16 is programmed to recognize any SCSI interrupt received from the host computer system 10 by the SCSI host interface 28 and service such interrupt accordingly. The various interrupts by the host interface 28 indicate the routine high level commands to read a disk drive, write a disk drive, execute sense commands, etc. The processor 16 carries out the various commands to write data to the various slave modules, read data therefrom or otherwise service whatever interrupt request has been transmitted from the host system 10. Periodically, the processor 16 accesses the host interface 28 according to a main control loop 300 and reads the various interrupt registers to determine if an interrupt request is present. The processor 16 accesses the SCSI host interface 28 by way of the 16-bit data bus 30 and 32-bit address bus 31. The accessing of the SCSI host interface 28 to determine interrupt requests is well-known to those skilled in the art. In particular, with an MB86604L SCSI interface chip, a particular set of registers are designated for providing the interrupt status thereof.

Main Control Loop Routine

Figure 12:
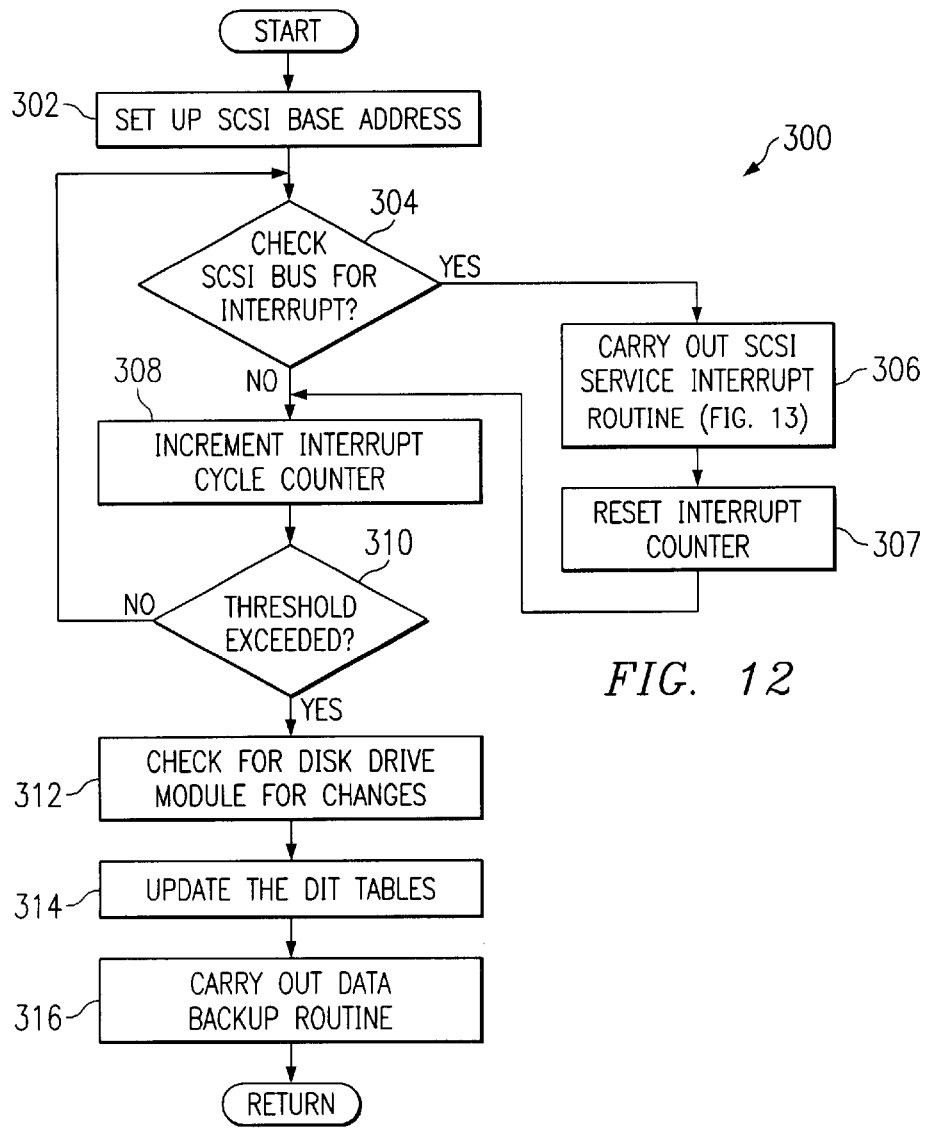
FIG. 12 is a software flow chart illustrating the primary functions of a main control loop routine carried out by the processor.

In addition to the servicing of interrupt requests from the host computer system 10, the processor 16 is programmed to carry out instructions of a main control loop, in which the interrupt service routine is a primary routine. The main control loop 300 is shown in FIG. 12. The source code associated with the main control loop is reproduced in Appendix B.

The main control loop 300 is entered after boot-up of the system. First, The digital signal processor 16 establishes an SCSI base address, as noted in program flow block 302. Next, a check is made to determine if there is an interrupt on the SCSI bus (block 304). Interrupts are determined by interrogating a register in the SCSI host interface 28 (FIG. 3). If there is an interrupt, processing branches to the SCSI interrupt service routine shown in block 306. This routine is described in more detail in FIG. 13. Briefly, the interrupt service routine 350 determines whether a command is received from the host system 10, and if so, the processor 16 verifies the status of various things and proceeds to carry out the command. In block 307, the interrupt counter is reset.

In the event that there is no interrupt, processing branches from decision block 304 to 308, where an interrupt cycle counter is incremented. Such a counter maintains an account of the number of interrupts that have occurred. If a sufficiently long period of time has elapsed and no interrupt has occurred, then the processor 16 can proceed in carrying out other routines, such as compressing data, back-up of data, etc. This assures that interrupts are serviced promptly so that the host system 10 does not encounter long response delays. Stated another way, a high priority is given to the servicing of requests from the host system 10. If no interrupt are received and the processor 16 has no other processing to do, the disk drives are powered down. Nevertheless, processing proceeds from block 308 to decision block 310, where it is determined whether or not the threshold of the interrupt cycle counter has been exceeded. The threshold is set to an arbitrary number, and in the preferred embodiment of the invention, is a count of about 400,000. In practice, the actual time corresponding to this count based on routine requests from a host system 10 is a very small period of time, less than one-fourth second. If the threshold has not been exceeded, meaning that very little time has lapsed since the last interrupt, processing branches from decision block 310 back to decision block 304 where another check is made to determine if an SCSI bus interrupt is present. If the threshold of the interrupt cycle counter has been exceeded, processing proceeds from decision block 310 to block 312 to check for any changes of the disk drive modules. A "change" of a module means that it has been removed from a slot, inserted into a slot, etc. The routine 312 carried out by the processor 16 interrogates the status of the module ID resistors 147 (FIG. 5) to verify if a particular module is in the slot or has been removed from the slot. The status of each module is maintained in a disk information table (DIT) to be described in more detail below. Accordingly, the processor 16 can determine if any change in status of the disk drive modules has occurred, based on a comparison of the status stored in the disk information table and the voltages across the resistors 147. If any changes are found with regard to the modules, the disk information tables are updated accordingly, as noted by program flow block 314. In this manner, any subsequent request or command from the host system 10 can be either processed or not processed, based on the current status of the disk drive modules. This is an important feature of the invention, in that the disk drive modules are removable by a user. In the event the system is configured for FAT-16 files, the disk drive data can be built, the DOS task file will be found, and such task file will be updated with the disk drive changes. Unlike commercially available systems, the present invention has the hardware and software capability for understanding FAT file systems so that data can be manipulated by the present invention, much like a disk operating system. Indeed, because the processor 16 is programmed to understand the file structures of disk drives, it can operate, manipulate or process the files all independently and transparent to the host system 10. The disk drive changes or status is set forth in Appendix F, where there is illustrated the software for the disk information table. The status of a drive can be any of the following; a status of zero means that the drive is functioning normally, a status of one means the drive is not present, a status of two means the drive has failed, a status of three means that the system has reset the drive, a status of four means that the drive has been reset by the SCSI interface, a status of five means that the removable drive was just installed, a status of six means that the removable drive was installed one command ago, a status of seven means that the primary drive has failed, and a status of eight means that the drive was just removed.

From program flow block 316, the processor 16 next determines if the data back-up routine needs to be carried out. Here, the data back-up routine is described in more detail below in connection with FIG. 17. According to the data back-up routine, whenever a copy disk drive is inserted into its slot, the processor 16 automatically copies the entire contents of the primary disk drive thereto. This is accomplished with a read and verify routine. The data back-up operation is triggered by the insertion of a drive into a respective slot of the copy disk drive. Importantly, any particular copy disk drive of a pair is fully backed up with the data of its partner primary disk drive, before proceeding to a back-up of data of another pair of disk drives. This assures that if the system defaults or crashes, the data of any one disk drive may be corrupted, without corrupting all of the disk drives. In the back-up operation, the processor 16 reads half of the drive buffer so that the lookahead read feature of the drive is always active. The data from the primary disk drive module is stored in the cache memory or buffer. Then, the corresponding half of the drive buffer of the copy disk drive is read and the two blocks of data are compared. If there is a match therebetween, the block of data on the copy disk drive is maintained and the subsequent block of data is processed. If, on the other hand, the data block of the primary and copy disk drives do not match, then the data block of the primary is written into the corresponding block of the copy disk drive. The data block is then read from the copy disk drive and verified with the primary drive data temporarily stored in the processor buffer. This type of back-up operation is independent of the host system and is carried out at high speed so that it is virtually transparent to the user.

SCSI Interrupt Service Routine

FIG. 13 illustrates a flow chart of the SCSI interrupt service routine 350 programmed as part of the main control loop 300 described above. The source code of this routine is at Appendix C. The interrupt service routine 350 is entered from the main control loop 300, whereupon the processor 16 accesses the SCSI host interface 28, using the address lines 31 and the data lines 30 connected therebetween. This is shown in program flow block 352. One register in the SCSI interface 28 identifies whether or not an interrupt exists, and another register identifies the particular interrupt. On receipt of the information from the SCSI interface 28, the particular interrupt is identified, as noted by block 354. Depending on the type of interrupt, different actions are required. Program flow block 354 identifies the various interrupts that are recognized by the processor 16. The primary interrupts processed by the processor are the A3, A6 and A7 interrupts. Although interrupts 01 and 60 are received and decoded, but not processed to the extent that significant actions are carried out. An interrupt decoded as an A3 interrupt indicates that an SCSI message is forthcoming. An A6 interrupt indicates the receipt of an SCSI command, such as read, write, request sense, etc. An A7 interrupt indicates the receipt of a command with an identify instruction. Such an interrupt indicates a nexus between logical units, eight of which are provided in the SCSI protocol. The A7 interrupt constitutes an SCSI reset that is effective to reset the SCSI bus. According to the invention, the high-speed data delivery system of the invention is substantially independent of the host system 10, and does not reset any equipment based on the A7 interrupt from the host computer system. Essentially, the processor 16 notes the existence of the A7 interrupt and ignores the reset portion of the same. Lastly, if an A7 interrupt is not detected, the processor determines if a stop command has been received to halt processing so that a message can be received. If none of the decoded interrupts noted in program flow block 304 are detected or decoded, then it is determined that no interrupt needs processing and an exit is made to the main control routine 300.

If a valid A3 interrupt is identified, as noted in program flow block 354, the "receive message" A3 interrupt is processed to save the identify byte, as noted in block 356. The various message bytes of the interrupt are stored by the processor 16. The third byte of the message indicates the substance of the message. If the third byte indicates a synchronous negotiation type of message, then a synchronous transfer of data will be accomplished between the host system 10 and the high speed data transfer system 22 of the invention. If the message is a wide transfer request, then more than eight bits are negotiated to be transferred. Other types of messages are generally dismissed by the processor 16. If an unidentified message is received, then an error management routine is entered, as noted in block 366. After processing by the error management routine, the main control loop routine 300 is again entered.

There may exist various errors recognized by the high speed data processing system 12 that are reported back to the host computer system 10. While other errors may be dealt with directory when carrying out various software routines, when the following errors occur, the processor 16 is directed to an error management routine. The errors dealt with in the error management routine include an unknown logical unit, such as when the SCSI command identifies a particular logic unit that does not exist in the high speed data processing system 12. Other errors include a media read error, a media write error and an illegal request error. When these errors occur, the responses thereto are handled in a request sense routine, described in more detail below. In other words, when any one of these errors occur, and when the host computer system 10 requests the nature of the error, the processor 16 responds to a request sense command. In the error management routine, the processor 16 enters an endless loop. This endless loop can be exited by a manual resetting of the processor 16. Alternatively, a watchdog timer can be utilized to sense when the processor is in an endless loop, and automatically reset itself.

In processing the A6 interrupt according to block 358, all the bytes of the command are collected and processed, as noted in program flow block 360. As noted above, the A6 interrupts identified read, write and other types of commands. Based on the various bytes, the particular logic unit is identified as the module to be selected for operation. The processor system then checks whether the specific logic unit is in a busy or idle status. If the processor 16 consults various tables and finds that the logic unit identified in the command bytes does not exist, then a message to that extent is transferred to the host system 10. The logical unit numbers utilized in the SCSI protocol can be used to uniquely identify the apparatus of the invention, including a chassis, subassembly within a chassis, a printed circuit card within a subassembly, etc. The processing of the command includes the identification of the particular command. The various commands are identified by the various bytes and processed accordingly. As is customary in processing SCSI commands, various checks are made to determine, for example, if the command is a request sense command, if it was preceded by an identifier, if the logical unit is active, etc.

While not specifically shown, the A7 command, unlike the A6 command, is preceded by an identifier message. In this instance, the logic unit number is obtained directly from the identifier message, rather than the command. It is noted that although some of the SCSI commands request diagnostics of the target device, the processor 16 is programmed to generally ignore such type of commands.

After processing the various commands noted above, the processor 16 proceeds to an exit routine and returns back to the main loop 300. In the exit routine, the processor checks the SCSI lines to the SCSI host interface 28. The processor 16 places itself in a mode to transfer two bytes, and places the status and message bytes on the SCSI lines, whereupon the processor returns to the main loop 300.

Initialize Current Copy Drive Data Table Routine

Figure 14:
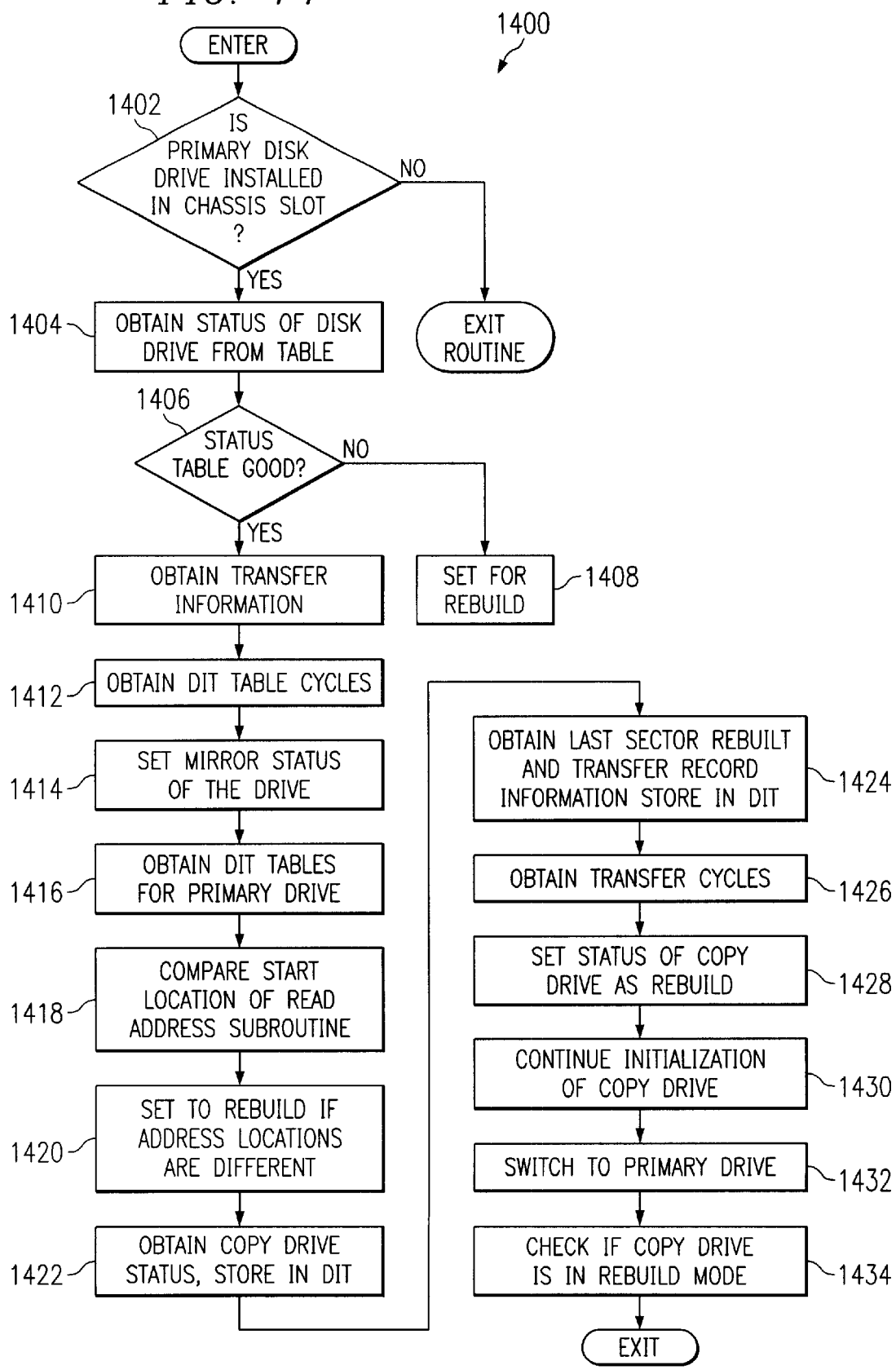
FIG. 14 is a software flow chart depicting the various steps carried out in an initialize current mirror drive data table.

Turning now to FIG. 14, there is illustrated a software flow chart 1400 of the programmed operations of the processor 16 in initializing the current mirror data drive table.

The information and parameters generated by this routine 1400 are important during bootup of the processor 16 as well as during the routine operation of the system 22. As described above, during routine operation of the processor 16 in reading and writing data with respect to the disk drive modules, the processor 16 mirrors the data from the primary disk drive to the copy disk drive. Various parameters are maintained in the system concerning the status of the primary disk drive as well as the copy disk drive. For example, during initialization of the system, except for the various parameters stored in tables, it would not be known if the data on the copy disk drive is identical to the data on the primary disk drive. Depending upon the parameters found in the disk information table (DIT), initialization may be carried out in which the processor 16 causes the data on the primary disk drive to be mirrored on the copy disk drive so as to start out with exact duplicate data on both drives. The disk drive pairs (primary and copy) are polled as to the parameters in the disk information table to determine if a back-up of duplicate data is required for the copy disk drive. Processing according to the flow chart of FIG. 14 continues as follows.

Initially, the processor 16 verifies if the primary disk drive is installed in the chassis slot. This can be done by ascertaining the voltage levels across the bus data bits ($D_0$–$D_7$). If the module device is installed in a slot, the bus data bits will not all be at a high logic level, but certain bits will be pulled low by one or more of the resistors 147. While not expressly noted, the software routine 1400 is carried out for each primary/copy disk drive pair, starting with the pair in the left-most chassis slot pair and proceeding to the right-most chassis slot pair. In the preferred embodiment, as to each disk drive pair, the primary module device is located in a chassis slot to the left of the copy drive. If the primary disk drive is not installed in its chassis slot, as noted in decision block 1402, processing exits the routine. If, on the other hand, the primary disk drive is properly installed in its chassis slot, then the processor 16 obtains the status of the disk drive from a DIT table that is stored on the disk drive (block 1404). The processor 16 obtains the DIT table, and a copy of the DIT table at one time. The latter table is stored on the disk drive being initialized. Both tables are brought into respective buffers of the processor 16. The parameters in the table for the particular disk drive are checked to determine if all is in order. If not, as noted in program flow block 1406, then the drive is set for rebuild of the data, as noted in block 1408. The status of a drive can be determined to be good or bad based on obtaining a read address parameter from the drive information table for that disk. The read program is located at such address. If the read address is indeed the location where the read program is located, then the drive is assumed to be good. In addition, the status of the copy drive and the status of the primary drive are retrieved from the disk information table and compared to determine if a rebuild of the data is indicated as being required. If a rebuild of the data is not required, this additional parameter indicates that the drive is operable and does not need a rewriting of data thereon.

Lastly, the processor 16 obtains the last rebuilt sector of the copy disk drive from the disk information table. It is noted that on boot-up of the system 22, the status of both the primary and copy disk drives is determined and written by the processor 16 in the respective disk information tables. After boot-up, the status of the primary and copy disk drives can be determined by comparing the status at the reboot time versus the current status of the drives. If the last rebuilt sector of the copy disk drive indicates that the prior rebuilding was carried out all the way through, then the copy disk drive is considered as good and operational. As noted in program flow block 1410, the processor 16 obtains transfer information of the disk drive from the disk information table. Particularly, the transfer record sector is obtained from such table. The transfer record sector essentially stores a number indicating the accumulated number of data transfers carried out by the disk drive. The transfer record sector information is compared with the number that is stored in the status register of the disk drive.

In program flow block 1412, the processor obtains information regarding how many cycles through the DIT table have been counted. Each cycle in the counter corresponds to 100,000 cycles through the DIT table.

The initialize routine 1400 described above can be more easily understood at this point by referring to the initialize module data table routine 1500 of FIG. 15. When the processor 16 carries out this two-part routine 1500, the module data table for each disk drive is initialized, such as during boot-up of the system. The first part 1502 of the routine shown in FIG. 15 essentially calls each of the disk drives to obtain a respective layout table so that the processor 16 can carry out the function. In the second portion of the routine starting at program flow block 1504, the processor 16 obtains the module ID value (block 1504). As noted above, the module ID value, or module type, is obtained by accessing the zero delay data transfer bus and reading the voltage across the resistors 147 located within the slave module 18 (FIG. 5). The module ID uniquely identifies the module by chassis slot and whether it is a primary or copy type of drive. In addition, the module type identifies the capacity of the disk drive itself, such as an 815 Mbyte drive, a 3.2 Gbyte drive, a 4.0 Gbyte drive, etc. The number of sectors that have been set up for each drive are predetermined, based on the storage capacity of the disk drive. Other important parameters are also established that fully characterize the disk drive. This is shown in block 1506 of FIG. 15. It is important to note that the maximum capacity of the disk drive is not available to the host system 10. Rather, a number of upper sectors of the disk drive are dedicated by the system 12 solely for use by the processor 16. The status table of the particular disk drive as well as other parameters are stored in the upper sectors of the drive storage medium. For example, in a disk drive having a capacity of 2.1 Gbytes, only about 2.01 Gbytes are available to the host system 10 as usable area for storing data.

In program flow block 1508, the location of the read routine is established in the module it data table. Similarly, the write location is specified. In block 1510, the processor 16 clears the appropriate registers to indicate that the disk drive status is good, meaning the drive is functional and usable. The host system usable length is next obtained, as noted by program flow block 1512. Again, the host system usable length is obtained from a parameter stored in the DIT table for that drive. In program flow block 1514, the number of status bytes is obtained, which at this point in time is a single status sector of 512 bytes. The processing up to this point places processing at the first transfer area. In other words, the hexadecimal address 10 is the holder of the location of the status register. In program flow blocks 1516, the processor carries out an add operation to obtain the first transfer record area.

FIG. 16 illustrates the disk drive data table 1600 in more detail. The lower portion of the disk drive storage area 1602 is dedicated exclusively to the storage of data by the host system 10. The status sectors are located in the disk storage area 1604 just above the host usable area 1602. Lastly, and starting at sector hexadecimal 10 and proceeding through sector 12, is the transfer record area 1606. In the DIT table, the total host usable area is defined by section 5 of the DIT table. As noted above, the variable identifies the number of status sectors.

With reference back to FIG. 15, program flow block 1518 shows that the last transfer record sector is also stored. A compare subroutine is next carried out, as noted in program flow block 1520. Here, two of the drives are compared. The compare subroutine is located at sector hexadecimal 14. Thus, if two disk drives are to be compared, such as during a back-up operation, the compare subroutine is carried out. Also, and as described above in detail, during a back-up operation of a copy disk drive, two sectors of data are brought into buffers from the primary and copy drives and compared, and if found to be identical, processing proceeds. If the two sectors are different in any manner, than the two sectors of the primary drive are written to the copy drive, and then verified to be sure that identical data exists in both drives. In program flow block 1522, the processor 16 indicates the storage capacity of the drive. In this example, the status would show that the drive is "2.1", meaning a 2.1 Gbyte capacity of the disk drive.

From the foregoing, it can be seen that for every disk drive, the parameters entered into the DIT table fully characterize each drive. While not shown in FIG. 15, for a drive that is not inserted into a chassis slot, the DIT table for that slot will show that sections 1, 3, 4, 5 and 14 are zero. The status in the DIT table will be set to "run" meaning that the slot is not occupied with a disk drive. It is important to note that even if the disk drive is not turned on or powered up and made operational, the DIT table for such drive can be filled in to fully characterize various parameters of the drive. The advantage of such a feature is that resetting of the system can be carried out very quickly. The use of the DIT table is extremely advantageous in view that numerous hard disk drives are utilized in the system 22 of the invention, while yet being able to be inserted and removed from the system. In brief summary, the DIT table yields significant information about each disk drive, including whether the drive is a primary drive or a copy drive, how it is configured, if it is removable, not removable, if it has been removed or has not been removed, the storage capacity, etc. As also noted above, the DIT table is stored in the memory of the processor 16, as well as on the storage medium of the disk drive itself. A typical DIT table of a disk drive is included herein as Appendix F.

After the module data information table is initialized, as shown in FIG. 15, the processor 16 proceeds in carrying out the routine 1400 (FIG. 14) for setting the mirror status of the drive. This is rebuilt. If the status is 2, then the drive will be rebuilt. The mirror status is then inserted and stored in the DIT table. It is noted that data is only mirrored from the primary disk drive to the copy disk drive and not vice versa. The terms "primary" and "copy" generally refer to the slot positions of the chassis, and not the drive itself. For example, a spare disk drive that was previously a primary drive, in that it was inserted into a left-most slot of the paired slots, can and will be configured as a copy disk drive when inserted into a right-most chassis slot. When this occurs, the processor 16 will note that the drive newly inserted into the left (primary) disk drive, and thus the status of the new disk drive will be set to "rebuild" so that it will have duplicate data. Also, the status of the right-most drive (which was previously configured as a primary drive) will be set to that of a copy drive.

The initialization of the mirror drive data table is the initialization of the hexadecimal value in the status register, which is called "mirror status." If the mirror status is zero, this means that the current drive is a primary drive, and if the status is a one, the drive is a copy drive. If the status is the number 2, this indicates the drive needs to be rebuilt. If the status is a 3, this means that the drive has failed and is waiting for repair. A status of 4 in the DIT table means that the drive is not a copy drive. A status of 5 means that the copy drive is not functioning. From the foregoing, it can be seen that only if the status of the drive is a 2, then is the drive rebuilt with data from the primary. Only after the rebuilding process, will the status show that the drive is a primary or copy type of drive. If, for example, a primary drive and a copy drive are reversed in the chassis slots, the data of each drive will be compared and found to be exact duplicates. However, the DIT table will indicate that the drive in the primary slot (left slot) was a copy type of drive, and the drive in the copy slot (right slot) was a primary type of drive. In this instance, the data will be copied from whatever type of drive is in the primary drive chassis slot, into whatever drive is in the copy drive chassis slot. In accordance with the preferred embodiment of the invention, data is never copied from a disk drive located in a copy drive slot to a disk drive located in a primary drive slot, unless the automatic backup features designates the particular drive as a copyable drive.

With reference again to FIG. 14, the processor 16 obtains the primary drive information table and also obtains the corresponding table that was stored off previously (block 1416). Comparisons therebetween are then made according to program block 1418. For example, the hex number 3 identifies the start location of the read subroutine address. If the read subroutine is different between the two tables, then it is likely that a software change or modification has been made such that the location of the read subroutine address is different. A negative result could also be due to the existence of a new disk drive inserted in the copy slot, where the drive has never before been rebuilt. If the comparison is negative, then the processor 16 proceeds in copying the data from the primary drive to the copy drive (block 1420).

The DIT table of each drive is maintained in volatile RAM, and thus is lost every time power to the system 22 is removed. However, once the DIT table is constructed for each disk drive, and stored in RAM, it is also copied off to the status sector of the respective disk drive. Importantly, the DIT table as it is copied to the status sector of the disk drive is not volatile and is always physically associated with the drive itself, irrespective of whether the drive is removed, reinserted, shelved, etc. However, each time the system is rebooted, new disk information tables are generated and stored off to the respective disk drives.

Next, the processor 16 obtains the status of the copy drive from the drive itself, based on what the drive status used to be when stored in the drive. The status of the copy drive is moved from the module data table to the DIT table. This is shown in block 1422. It is noted that the status of the copy drive was not established during initialization. The location of the last sector rebuilt is also obtained and placed in the DIT table. Next, the transfer record information is obtained and then stored off (block 1424). Also obtained is the number of transfer cycles (block 1426). The transfer information includes the size of each transfer, whether the transfer was a read or write, the time taken to accomplish the transfer, etc. The number of transfer cycles is important, in that if the number of cycles is small, then it is known that the data in the upper locations of the disk is either unreliable or unusable data. If the number of transfer cycles indicates that it is the second time through, then it can be determined that the data therebelow is the most recent data, and the data thereabove is the oldest data. Essentially, a wraparound of the transfers is accomplished. If the counter shows that more than one cycle has occurred, then it is known that the data above the present disk location is good data, albeit old data. In the preferred embodiment of the invention, the system has been designed to err on the side of rebuilding a copy disk drive as it only requires 5.5 minutes per gigabyte of data.

If the first copy disk drive does not indicate a status of "good", then the status is set for rebuild, i.e., the current status sector rebuild is set to zero. The status of the copy drive is then set to 2, indicating that a rebuild is to occur. The status of the drive is set as rebuild in program flow block 1428. The initialization continues (block 1430). Next, the first sector of transfer recorded information is copied from sector 10 to sector 11. This effectively causes the first sector of transfer recorded information to go to the current transfer record sector not yet coded. New transfer information is thus established. Again, when different read addresses are involved, this is an indication that new software has been installed and the copy drive must be rebuilt. At this point in the initialization of the current mirror drive data table routine 1400, the processor 16 proceeds to the copy disk drive. Again, the drive status of the copy drive is obtained. If the copy disk drive is functioning normally, processing continues. If the copy disk drive is not functioning normally, then the DIT of the primary drive is set for rebuild. The reason for this is essentially because there was no copy disk drive in the slot to rebuild. The status sector for the copy disk drive is then obtained. The copy disk drive DIT and the status sector are then obtained. If the read addresses are not the same, then the copy disk drive is rebuilt. If, on the other hand, the copy disk drive did not have a status of "good", then the status is set to 1, which effectively sets the pointer back to the first sector. The first sector of the transfer record area is obtained and set back at the beginning of the drive. If the read addresses are found to be the same, processing continues to obtain the copy disk drive status and place the status in the DIT. The last sector that was rebuilt is obtained and also placed in the DIT. The transfer information is obtained and such information is placed in the DIT, as is the cycle information obtained from the module data table.

The processor 16 switches back to the primary drive in accordance with the initialization of the copy drive software routine. This is shown in block 1432. The primary drive is then checked to determine if it is functioning. If the primary drive is not functioning properly, then the status thereof is placed in the DIT table, and the processor exits the routine. If, on the other hand, the primary drive is functioning properly, the status of the copy drive is obtained from the DIT table to determine if it has failed. Again, if the copy drive is not functioning properly, the processor exists the routine. A status of "3" obtained from the DIT table means that the copy drive is not functioning properly. If this status shows that the copy drive is "2", this means that the copy drive is already in the state of rebuilding the data from the primary drive. In addition, if the copy drive is not in the system, as shown by the status, rebuilding will be initiated. There are a number of status checks carried out on the copy drive to determine if it is functioning properly, and if not, the rebuilding of the data is in order.

The next major function carried out by the processor 16 is to determine if the copy drive, which is now functioning properly at this point in the routine, is in the rebuild mode (block 1434). If the status table of the copy drive shows that it is in a rebuild mode, then the rebuild of data thereon will be carried out again, as a previous rebuild was apparently incomplete. If the copy drive is not in the rebuild mode, a comparison is made between the DIT table of the primary drive and the copy drive status sector. This is essentially the location where the copy drive DIT can be found. On the other table it is the primary drive DIT. As can be seen, the processor 16 flips back and forth between each other. If it is desired to find the primary drive DIT, or the other drive of the pair of drives, this is the location of the address where it is found. The processor also checks to determine if the current transfer record is the same. If so, then it is probably a good drive. If the transfer record is off by five, this means that both the primary and copy drives were not involved in the same number of transfers. Again, if this is the case, then the copy drive is rebuilt. In addition, the processor 16 determines if the loop counter in both the primary and copy drives are the same. If not, then the copy drive is again set for rebuild. As noted above, the counter counts the number of transfers of both the primary drive and the copy drive. When the foregoing operations are completed, the data in the DIT is stored in the status table of the respective drive. It should be noted that the foregoing initialized copy drive information table is not the rebuilding operation itself, but rather a determination of whether the copy drive requires rebuilding of the data from the primary drive.

Rebuilding Copy Disk Drive

Turning now to FIG. 17, there is illustrated a flow chart 1700 depicting the operations carried out by the processor 16 in rebuilding data between pairs of disk drives, such as rebuilding a copy drive with data from a primary drive. It is noted that a copy drive is not rebuilt with data using a continuous series of data transfers, as this would deny processing time for carrying out other requests from the host system 10. Rather, a copy drive is rebuilt in an interrupted manner while the processor 16 is also carrying out other requests. In the preferred embodiment of the invention, 64K of data is transferred from the primary drive to the processor buffer for use in rebuilding the copy drive. According to program flow block 1702, data is transferred from the primary drive to the processor buffer. Next, the processor reads 64K of data from the copy drive, as noted in block 1704. The data read from the copy drive is then compared with the data temporary stored in the processor buffer, which data was transferred from the primary drive. The comparison step is shown in decision block 1706. If the primary data and copy data are identical, processing branches from If, on the other hand, the data compared is not identical, the processor 16 writes the buffer data (from the primary drive) to the copy drive, as noted in block 1708. Next, the processor 16 verifies that the primary drive data written into the copy drive was properly written. In doing so, the processor 16 reads the same block of data from the copy drive that was just written therein, as noted by program flow block 1710. In decision block 1712, the processor 16 then compares the data read from the copy drive with the primary drive data yet stored in the processor buffer. If the result of the comparison is affirmative, then processing branches back to block 1702, where the next block of data is transferred from the primary disk drive.

It should be noted at this point that if it turns out that very little updating of the copy drive data is needed, the operation is carried out very quickly, as reading hard disk drives can be carried out much faster than writing hard disk drives. The writing of the copy disk drive with the primary disk drive data requires more time because verification of the written data is carried out, as noted in decision block 1712. This is an important feature of the invention, in that it is not assumed that the data written to the copy disk drive is written properly. It is noted from the foregoing that if the data of the primary disk drive compares identically with the data in the copy disk drive, then no write operation at all is involved. Rather, if the data in the copy disk drive is identical to that of the primary disk drive, then the data remains stored in the copy disk drive, as is. The only time a write operation is involved is when the data on the copy disk drive does not identically match the corresponding data on the primary disk drive. It can be seen that if very little data between the primary disk drive and the copy drive matches, then many write operations will be required to write the primary disk drive data buffered in the processor, to the copy disk drive.

If the data read back from the copy drive for verification does not compare with the primary disk drive data in the processor buffer, processing branches from decision block 1712 to block 1714, where another read back and verification takes place. If after several read backs of the data from the copy drive and comparison with the data of the primary drive in the processor buffer there is still no match, then the copy disk drive is flagged as defective. It is also noted that if a portion of the copy disk drive is itself defective, the disk drive itself automatically carries out relocations of data sectors to bypass the defective portion. Thus, if the data nevertheless read back from the copy drive cannot be compared with the primary disk drive data temporarily stored in the processor buffer, then the copy disk drive is indeed defective. From block 1714, processing proceeds to program flow block 1716 where return is made to the main loop where the processor 16 determines if any interrupts from the host system 10 need to be serviced. If not, then the processor 16 will again enter the routine 1700 for rebuilding another block of data from the primary disk drive to the copy disk drive.

It is also important to note that blocks of data of a desired size are considered for rebuilding so that long periods of time are not devoted to rebuilding and interrupts cannot then be quickly serviced. As noted above, in order to facilitate high speed rebuilding, only half of the processor buffer is utilized at a time for comparing, verifying, etc, while data is being transferred from the primary disk drive to the other half of the processor buffer. In this manner, two separate functions required in the rebuilding process can be carried out at the same time. It is also noted in the foregoing that the comparison process is carried out in software, on a 32-byte by 32-byte word basis. It is also noted that the rebuilding process is carried out on-line during processing of host system requests, so that the back-up of data is the newest version of the user data. This contrast with prior art back-up processes where the function is carried out after office hours and during a time when the system is otherwise unavailable to users. Additionally, the files that are being copied from the primary disk to the copy disk drive can be open files, whereas the prior art techniques require the files to be closed before back-up begins.

In addition to the back-up routine noted above, the processor 16 is programmed to mirror on the copy disk drive all new data that is written to the primary disk drive. Thus, any changes to the data on the primary disk drive will be automatically mirrored and updated on the copy disk drive, independently of the data back-up routine. The mirroring function is carried out in accordance with the write routine programmed into the digital signal processor 16. The mirroring of data so that identical data exist in both the primary and copy disk drives is accomplished in the following manner.

When writing data to the primary disk drive, the processor 16 first places the data in a buffer so that the data can be written into the master-side data registers 90 for subsequent transferral via the high speed data bus to the primary disk drive. In addition, the data in the processor buffer is also transferred in a similar manner to the copy disk drive to be written therein. It is understood, of course, that both the primary disk drive and the copy disk drive need to be setup for writing data therein. Of course, if the copy disk drive of the pair is not inserted into the chassis slot, no mirror data is written therein. Hence, prior to any write operation of the copy disk drive, the DIT table is consulted to verify whether or not the appropriate copy disk drive is functional. Other reasons that the copy disk drive may not be written during the mirroring process, is that it has failed, it has been made inactive by the processor 16, or that the primary disk drive has been removed, whereupon the processor 16 is programmed to continue functioning with the copy disk drive, as if it were a primary. Accordingly, even when the primary disk drive has failed, it is removed, or cannot be accessed for any other reason, the processor 16 automatically functions with the copy disk drive to maintain service to the host system 10. Preferably, as soon as it is determined that the primary disk drive is nonfunctional for any reason, a flag denoting the same is written in the DIT table of the copy disk drive so that the processor thereafter knows that it must function with the copy disk drive, as if it were a primary. Moreover, as soon as a primary disk drive is found to be nonfunctional, any mirroring or back-up of the data from the primary disk drive is halted. This prevents erroneous data from the primary drive being written to the copy disk drive. In any event, if the primary disk drive is not reliable, but the copy disk drive remains functional, various flags and/or status settings can be written to the DIT and appropriate registers to signify that the primary drive has failed, and that the copy disk drive must be removed and placed in the primary disk drive slot in order for the system to continue functioning. Also, when the status of the primary disk drive is set to nonfunctional, then the system will not reboot, even if the copy disk drive is functional and remains in the copy disk drive chassis slot. If this event occurs, and the system is powered down so that the primary disk drive can be replaced with the copy disk drive, the system can be rebooted so that the copy disk drive now functions as a primary. In addition, to safeguard against system down time due to faulty disk drives, a new disk drive should be placed in the empty copy disk drive slot, whereupon the rebuild routine will be carried out to rebuild all of the data on the new copy disk drive, that was previously on the old copy disk drive that has been placed in the primary disk drive slot.

With regard to read operations, when primary and copy disk drives are functioning, the processor 16 will normally be programmed to retrieve data from the primary disk drive. However, the processor 16 can also be programmed to maintain an account of where data is located on each drive, and where the read heads of each drive are physically located. In this manner, if a read head of a copy disk drive is physically closer to the data to be read then that of the primary disk drive, then the processor 16 will retrieve the data from the copy disk drive, thereby reducing the time in which a read command from the host system is carried out. Since the processor 16, and not the host system 10, determines where data is to be written, then it is known where such data resides on both the primary and copy disk drive. Importantly, the same data need not necessary be written in the same location of the disk drives, as there may exist faulty sectors of one disk drive, whereupon such sector is skipped during the writing process and written in another, reliable sector location. Also, since the processor 16 determines where data is to be written, it is also known where the heads of the respective disk drives have last been physically placed. The processor 16 can also be programmed to consider that after a certain period of time has elapsed and a disk drive remains inactive, then the heads of the disk drive are automatically moved to a park position. This is a characteristic feature of many lap-top computer disk drives, which are preferably for use in accordance with the invention.

Figure 18:
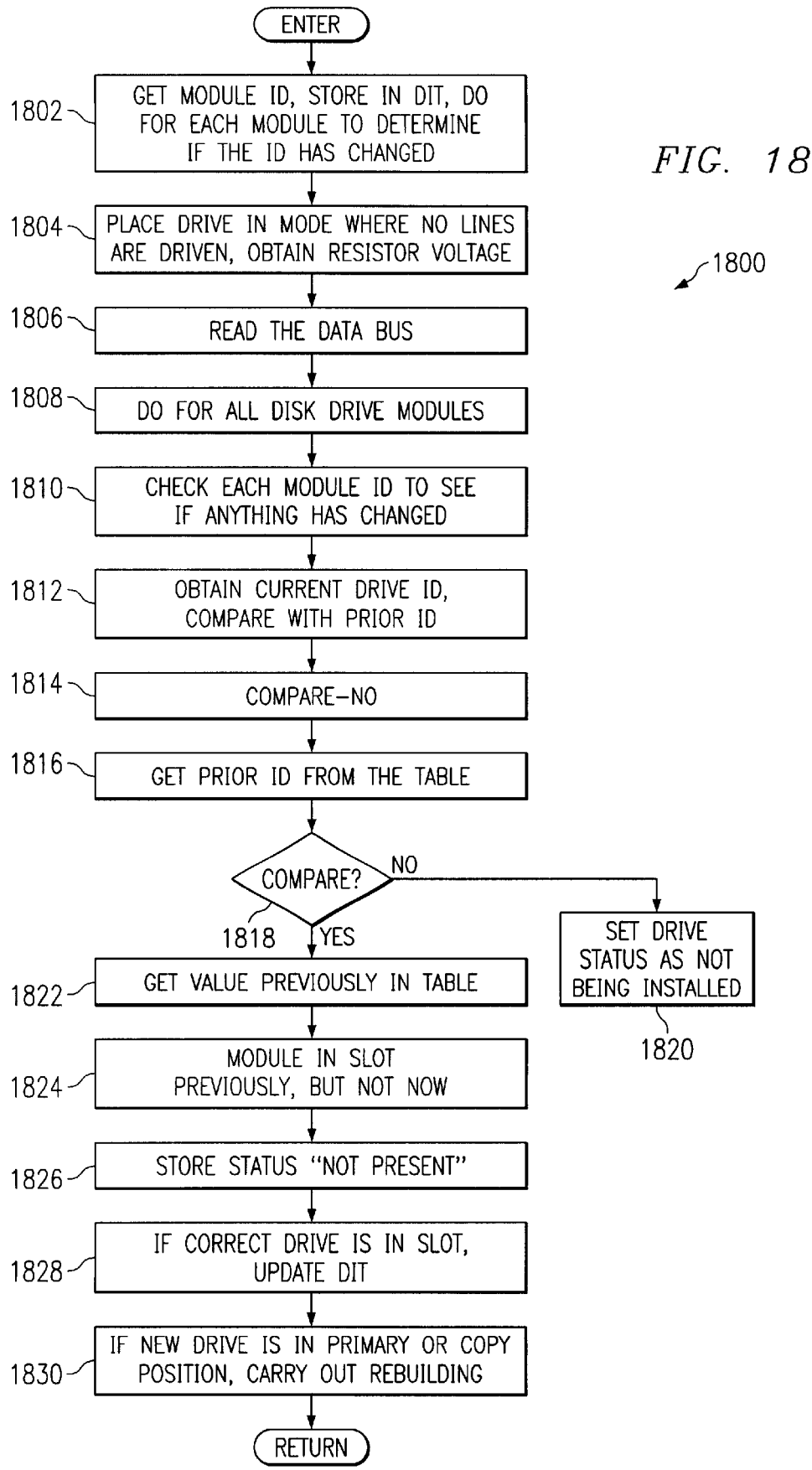
FIG. 18 is a flow chart of a get-module ID and store it in DIT routine.
Figure 19:
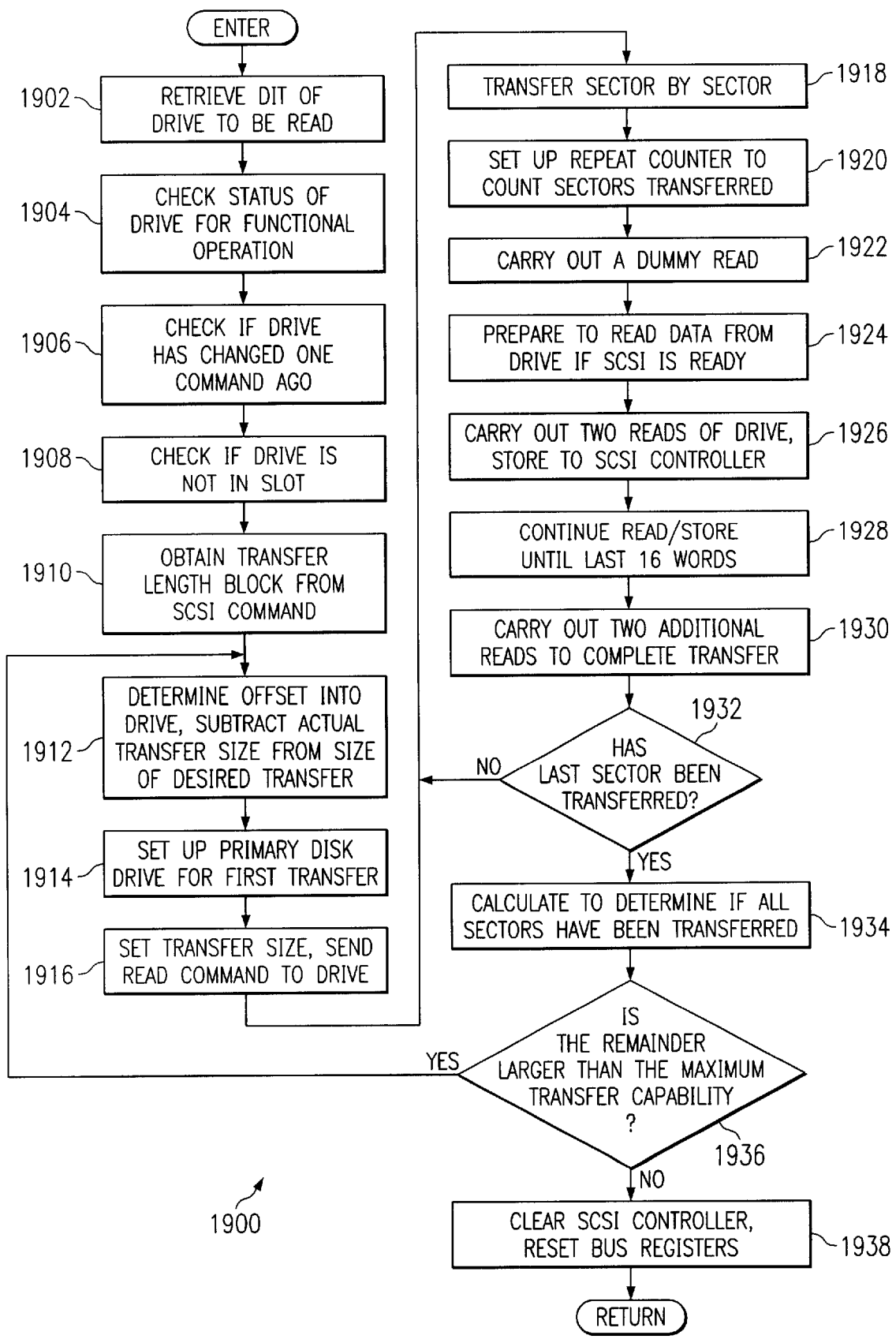
FIG. 19 is a flow chart depicting an SCSI read command routine.

With reference now to FIG. 18, there are illustrated the steps carried out by the processor 16 according to a routine 1800 called "get module ID and place in DIT". In practice, the routine "get module ID in place in DIT" is called from the initialization routine in the main loop. This routine is especially important in view that the hard disk drives are removable and/or replaceable in the various chassis slots. Hence, it is highly important that the processor 16 carry out requests from the host system 10, knowing the manner in which the disk drive slots are populated.

According to this routine, and when not otherwise servicing host system interrupts or carrying out back-up functions, the processor 16 routinely checks the status of all of the hard disk drives. As to any hard disk drives that have changed in any manner, the respective DIT table is modified accordingly. If the DIT table does not need to be changed based on any change in the hard disk drives, then the processor 16 determines whether any back-up of data is required with regard to the copy disk drives.

As noted in FIG. 18, the first portion of this routine 1800 establishes a loop in which each of the disk drive positions is checked. Once the routine 1800 is entered, the processor 16 accesses the slave module bus resistors 147 to obtain the particular module ID, as noted in block 1802. The module ID is then stored in the DIT for that disk drive. The next value is then obtained i.e., the next DIT and checks it again. This is repeated for each disk drive to see if the ID has changed.

In program flow block 1804 the drive is placed in a particular mode and no data signal or address lines are driven so that the voltage across the resistors 147 is not affected by the driving capabilities of the disk drive. The voltage values across the resistors are then obtained by the processor, via the buffers and placed in a processor register. In program flow block 1806, the processor resets the bus. The processor repeats this operation for each module (block 1808). In block 1810, the processor returns to program flow block 1802 to check each module ID to see if anything has changed. Essentially what has occurred from the foregoing, is that the processor has obtained the module ID of each drive, and written it in the respective drive DIT. Now, in block 1812, the processor 16 obtains the current drive ID and places it in the type table and compares it with what has gone before. This is shown in blocks 1812 and 1814. If the result is negative, the processor obtains the previous ID for that drive from the table, as shown in block 1816. Another comparison is accomplished, as shown in block 1818, to see if there was a change before. If the comparison in block 1818 is negative, this means that the drive is not one of the drives and the processor sets the drive status as not being installed, as shown in block 1820. In other words, the number of the drive is not one of the valid numbers. If, on the other hand, it is one of the drives, processing branches from block 1818 to block 1822 where the processor 16 obtains the value previously in the table and compares the value with one of those. In block 1824, the processor 16 checks to see if there was a drive module in the slot previously, but not any more. In block 1826, the processor 16 stores the status that the drive is not present in the slot. This establishes various parameters for the modules so that the processor 16 has information concerning whether or not proper disk drives were in the respective chassis slots. Some of the foregoing steps can be repeated a number of times for each module to verify that the same response is obtained multiple times in a row to avoid any erroneous identification of any module as it is actually being inserted into a chassis slot. In block 1828, if the correct drive is found in its respective chassis slot, then the DIT table is updated with the new disk drive parameters. In block 1830, if a new drive is in the primary or copy position, then a rebuilding thereof is carried out. The reason for this is that the drive itself has changed from that previously in the slot position.

SCSI Read Command

Another routine called as the result of the processing of the main loop 300 by the processor 16 is the SCSI read command. This routine 1900, shown in FIG. 9, is carried out when the SCSI command from the host system 10 is a read of the disk drive storage system for obtaining data. In carrying out this host system command, the processor 16 decodes the relevant SCSI information for accessing the primary disk drive for obtaining the desired data. The end of program flow block 1902, the processor 16 retrieves the DIT table from the primary disk drive that has the data stored thereon as requested by the host system. The status of the primary disk drive is checked to determine if the drive is functional. This is shown in block 1904. The status numbers 0–8 shown in the disk drive information table illustrate the various status indicators that each disk drive may have. A further check is carried out to determine if the primary disk drive has changed one command ago (block 1906). If so, the DIT table of the drive is updated. Next, a check is made to determine if the primary disk drive is not present in its assigned chassis slot (Block 1908). If it is not, the processor exits the SCSI read command routine. Also, if the drive is not present, data cannot be read therefrom and an appropriate SCSI status is returned to the host system 10. In addition, a request sense data is carried out where the sense data constitutes the change which indicates that the drive was not installed. Moreover, the processor 16 checks if the drive has failed, and if so, an appropriate SCSI status is returned to the host system 10. As can be appreciated, various status checks are carried out to verify or determine the exact status of the disk drive attempted to be read in response to the SCSI read command.

In any event, when the drive to be read indeed exists in a slot and is functional, the processor 16 obtains the transfer length block information for the SCSI command, as shown in block 1910. Stated another way, a number of sectors to be read is obtained. In addition, the processor 16 determines the number of bytes that will be transferred, based on the block length requested. In program flow block 1912, the offset into the primary disk drive is determined. According to the hardware of the present invention, a maximum of 100 hexadecimal bytes is possible. Thus, if the subject command calls for a transfer of more than 100 hexadecimal bytes, then multiple transfers are required. To do this, the number of bytes actually transferred in one transfer will be subtracted from the number of bytes requested by the SCSI command. Each subsequent transfer is also subtracted from the desired transfer size, until the SCSI read command is completed. As each transfer is accomplished, the address pointer to the next block of data is set accordingly. In program flow block 1914, the primary disk drive is set up for the first data transfer. In doing this, the primary disk drive is tested to determine if it is already busy. If the primary disk drive of interest is not busy, then the processor 16 sets the type of drive, logical block address drive 0, sets the value in the drive (the type of drive), sets the first 8 bits of the logical block address, sends the logical block address of the last 8 bits, etc. Next, the transfer size of the first data transfer is set, as shown in block 1916. The transfer size can be a maximum of 256 sectors. Also, the command to be sent to the primary disk drive is set to "read". As shown in block 1918, the transfer is initiated, on a sector-by-sector basis. In program flow block 1920, a repeat counter is set up to count the number of sectors transferred. This allows the high speed data transfer system to transfer sectors of data, until all data that is requested has been transferred.

In block 1922, the dummy reads are set up so that after two read cycles, the data actually read from the disk drive is presented to the processor 16. The dummy reads are necessary to move the data from the slave data registers 134 to the master data registers 58 of the zero delay transfer bus system. The actual read of data from the disk drives is then carried out, provided the SCSI system is ready (block 1924). In program flow block 1926, two read operations are carried out to transfer data from the disk drive. This data is transferred and stored in the SCSI controller 28. The processor 16 continues to read and store the data in pairs of read operations, as noted in block 1928. This continues until the last 16 words of the transfer. During the reading and storing of the data to the SCSI controller 28, the processor 16 checks to determine if the controller can handle additional data. Once the SCSI controller is empty, the processor causes more data to be transferred. With this technique, about three megabytes per second of data can be transferred from the primary disk drive to the SCSI controller. This differs from the customary practice of checking the status of the SCSI buffer after each data transfer. In program flow block 1930, the processor 16 carries out an additional read operation that do not cause data to be actually read from the primary disk drive, but rather functions to complete transfer of the remaining data through the data registers of the zero delay transfer bus. In other words, the last two read operations do not result in the reading of data from the primary disk drive, but only the completion of the transfer of data from the data bus to the processor 16.

In program flow block 1932, it is determined whether the last sector of data has been transferred. If the last sector has not been transferred, processing returns to the input of block 1918, when another sector is read and transferred. If the last sector has been transferred, then the processor 16 does a calculation to determine if the all sectors requested by the SCSI read command have been transferred. If the calculation results in an affirmative decision, then the processor 16 exits the routine. If not, processing proceeds to block 1936. Here, it determines if the remainder to be transferred is larger than the capacity for a single transfer by the zero delay transfer bus. If the remainder of data to be transferred is larger than the maximum transfer capability, then the maximum is subtracted from the remaining portion of data to be transferred. Also, the transfer length of the next transfer is set and processing returns to block 1918 where the next sector is transferred. The program flow blocks between 1918 and 1936 represent inner loop in which data is transferred from the primary disk drive to the SCSI controller, sector-by-sector, until the last sector is transferred in accordance with the maximum transfer capability of the zero delay data transfer system. The program flow blocks between 1912 and 1936 represents an outer loop for controlling the number of maximum data transfers so as to assure that all sectors have been read and transferred, as requested by the SCSI read command.

Lastly, when all of the data sectors have been transferred, as required by the SCSI read command, the processor 16 clears the SCSI controller and resets the bus registers and returns to the main loop 300.

While the foregoing SCSI read command involves the reading of only the primary copy drive, the speed with which the read command can be completed is facilitated by also setting up the copy disk drive for reading. In this manner, the reading of sectors can be ultimately obtained from the primary and copy drives, thereby speeding up the overall reading operation. In other words, while the processor is preparing one drive to read, the other drive can be actually carrying out the reading of data therefrom. Since both drives have identical data, no compromise is made in the integrity of data as ultimately read from both drives.

SCSI Write Command

With reference now to FIG. 20, there is illustrated in simplified form the SCSI write command routine 2000. Again, the SCSI write command is carried out in response to an SCSI interrupt that has coded therein a write command. The flow chart of FIG. 20 is shown in simplified form because the SCSI write command is substantially the same as the SCSI read command in many respects, except that two disk drives are involved in a writing operation, whereas only a single disk drive is involved in the preferred embodiment with a read operation. Once the SCSI write command is entered from the interrupt service routine 350, data is read from the SCSI controller and temporarily stored in a register, as noted in program flow block 2002. Next, and as noted in the block 2004, a processor 16 checks to determine if the primary disk drive is active. If the primary disk drive is not active, then the data is written from the registers to the primary disk drive (block 2006). In block 2008, the processor 16 checks to determine if the copy disk drive is active. If such drive is not active with other functions, then the data is written from the register to the copy disk drive (block 2010). The foregoing operation is continued for each block of 32 bytes until all of the data transferred from the host system 10 has been written in the primary disk drive and mirrored in the copy disk drive.

Request Sense

Another command that is frequently transmitted by the host computer system 10 and carried out by the high speed data storage and processing system 12 is the request sense routine 2100. A request sense command is processed from the main control loop routine 300 in a manner much like the read and write commands. The request sense command is in essence an inquiry by the host system as to the status of the target device, based on the last command that was carried out. If the last command failed for whatever reason, the host computer system 10 can determine the nature of the failure by issuing a request sense command. In response to a sense command, the high speed data storage system 12 replies with the sense condition produced by the last command.

With reference now to FIG. 21, there is illustrated a software flow chart 2100 for processing a request sense command. When the processor 16 recognizes the request sense command, it enters the routine 2100. In block 2102, the processor 16 determines whether the error was caused by an invalid command. This type or error is determined from SCSI apparatus itself. In block 2104, the processor 16 returns a message to the host computer system 10 that the error was an SCSI error. In block 2106, the processor 16 checks to determine if the logical unit associated with the last command is active. If the logical unit is not active, then a message concerning the same is returned to the host computer system 10, as noted in block 2108. In program flow blocks 2110 and 2112, the processor checks to determine if a read or write error has occurred with regard to the last command, and if so, returns a message to the host system 10 concerning the same. Next, the processor 16 checks to determine if the drive associated with the last command is functional. If the drive is good, no sense data will be returned by the processor 16 to the host system 10. On the other hand, if the drive has failed, the processor 16 can determine such information from the DIT table of the drive. A message concerning the same is then returned to the host system 10. As noted in block 2116, other failures of the last command concerning the drive may be that the drive is not present in its slot. If no error is associated with the last command, then a message is sent to the host system that the status is normal (block 2118).

When an error is found, the processor 16 stores the number of transfers that it will carry out depending on the length that it wanted which is identified in byte 4. The processor 16 loads a send data command, checks if it is ready and proceeds to send the information to the host computer 10, as shown in block 2120. In practice, a small loop in the routine is provided to transfer all of the sense information to the host computer 10. This completes the basic response by the processor 16 in responding to a request sense command from the host computer 10. In accordance with the invention, on the transmission of every command response to the host computer system 10, the processor 16 appends a check condition status to each command transmitted by the processor 16. Hence, the host system 10 is made aware that either the high speed data processing system 12 is operating properly, or has incurred a fault condition.

While the forgoing preferred embodiment carries out the rebuild operation in the main control loop, this is not always necessary. In some cases it may be preferable to rebuild various disk drives at predetermined times or intervals. For example, it may be advantageous to automatically rebuild certain or all of the disk drives three times daily, daily, every other day, weekly, monthly, etc. In order to do this, the processor 16 can be programmed to receive from the host computer system 10 an indication of time, from the real time clock. At programmed times, the processor 16 can then automatically carry out the rebuild process as described above. Moreover, the processor 16 can be programmed to carry out a rebuild at such intervals with only certain pairs of disk drives, while leaving the others to be rebuilt according to the main control loop. It may further be advantageous to program the processor 16 to allow a certain disk drive module to be inserted into a chassis slot and to allow rebuilding of other modules therefrom, without allowing new data to be written into the module inserted into the chassis. A "read-only" function can thus be imposed on one or more drives by the processor 16.

Figure 22:
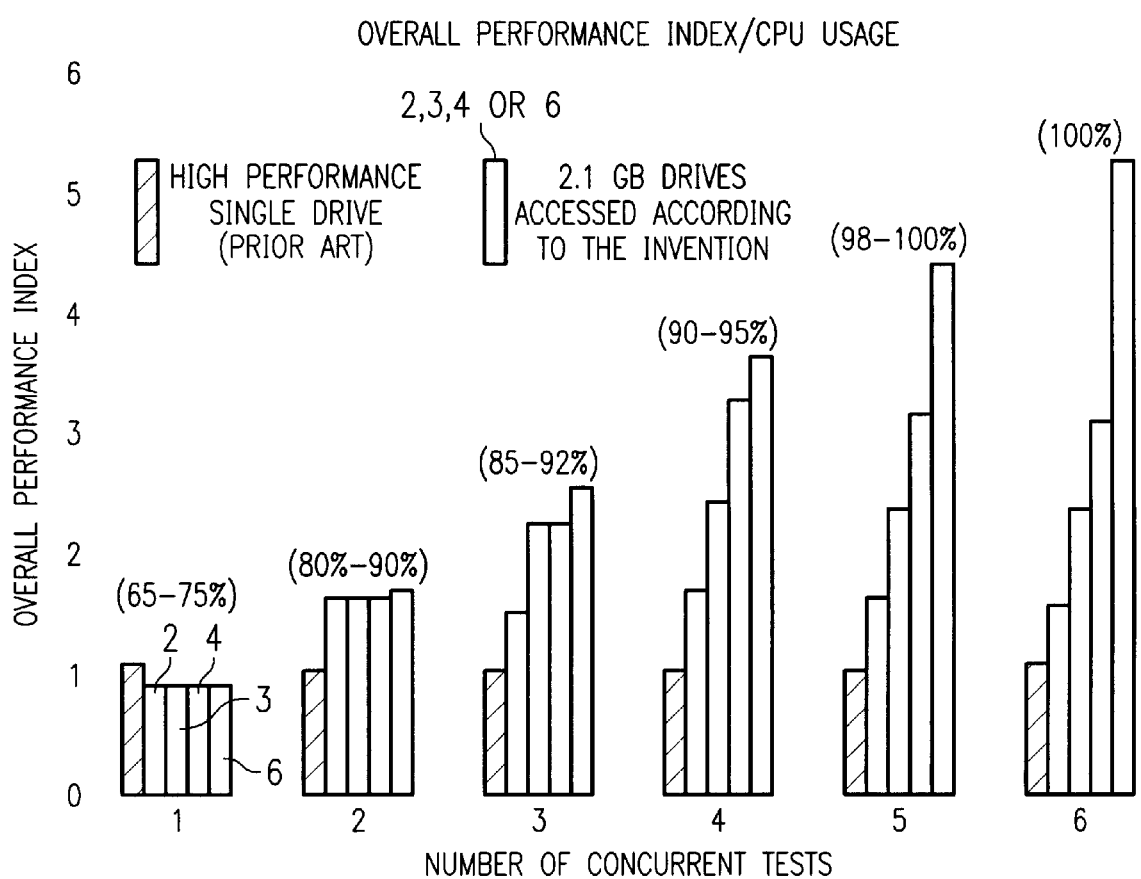
FIG. 22 graphically depicts the comparative performance of the multidrive accessing technique of the invention.

It has been found by experimental tests that the use of multiple disk drives which are accessed in accordance with the invention outperforms conventional disk drive systems, even those utilizing high performance disk drives. Indeed, the use of multidrive accessing, even of medium performance lap-top type of hard disk drives as identified above, provides increased performance as a function of the number of hard disk drives utilized. FIG. 22 illustrates the comparative results of six concurrent tests carried out with one prior art high performance disk drive, as compared to the invention in which two, three, four and six laptop hard disk drives were accessed in accordance with the invention as described with the preferred embodiment. It can be seen that when two or more disk drives are accessed according to the invention, enhanced performance is always achieved as compared to a single disk drive that is accessed in a conventional manner.

While the preferred embodiments of the methods, apparatus and software have been disclosed with reference to specific processor, bus configuration and slave module apparatus, software routines, and the like, it is to be understood that many changes in detail may be made as a matter of engineering and software choices without departing from the spirit and scope of the invention as defined by the appended claims. Indeed, those skilled in the art may prefer to embody the circuits in different forms, and in light of the present description they will find it easy to implement such choice. Also, it is not necessary to adopt all of the various advantageous features of the present disclosure into a single composite system in order to realize the individual advantages. Accordingly, such features are individually defined as sub-combinations in some of the claim which follow.

What is claimed is:

1. A data transferring system, comprising:
   a processor;
   at least one slave device;
   a data bus carrying data between said processor and said slave device, said data bus including:
      a plurality of conductors forming a multibit data bus,
      a plurality of master data storage devices coupling said processor to said multibit data bus,
      a plurality of slave data storage devices coupling said multibit data bus to said slave device;
   said processor controlling loading of data into said master data storage devices in a sequential manner, and said processor controlling said master data storage devices for simultaneously transferring data from all said master data devices onto said multibit data bus; and
   a control circuit for controlling the operation of said slave data storage devices to thereby control the transfer of data to said slave device.

2. The data transferring system of claim 1, further including a plurality of slave devices, and wherein said multibit data bus has N conductors, and each slave device has associated therewith N slave data storage devices, each slave data storage device of each slave device being coupled to a respective bus conductor.

3. The data transferring system of claim 1, wherein each said master and slave data storage device comprises a transceiver register for allowing bidirectional storage and transferral of data.

4. The data transferring system of claim 1, further including master and slave signal storage devices connected by plural bus conductors for transferring address information from the processor to the slave device.

5. The data transferring system of claim 1, wherein said processor is coupled to said master data storage devices by an L-bit processor bus, and said master data storage devices comprise M groups, where L×M is equal to N.

6. The data transferring system of claim 5, wherein each said slave device is associated with N number of slave data storage devices.

7. The data transferring system of claim 6, further including a slave data bus connecting said slave data storage devices to said slave device, and wherein said slave data bus includes N number of conductors.

8. The data transferring system of claim 5, wherein said processor is programmed to sequentially transfer L-bits of data to each group of said master data storage devices and then simultaneously transfer N-bits of data via an N bit data bus.

9. The data transferring system of claim 1, further including a read/write control circuit controlled by said processor for selecting desired slave devices for the communication of data thereto.

10. The data transferring system of claim 9, wherein said read/write control circuit includes at least one different control line coupled therefrom to a respective slave device.

11. The data transferring system of claim 1, wherein said master data storage devices comprise bidirectional registers for writing data therein by said processor, and for reading by said processor for transferring data from said master data storage devices to said processor.

12. The data transferring system of claim 1, wherein said slave data storage devices comprise bidirectional registers for writing data therein by said slave device, and for reading by said slave device for transferring said data from said slave data storage devices to said slave device.

13. The data transferring system of claim 1, wherein said processor includes a data port for transferring L-bits at one time, and said data bus has LM conductors, where M is a positive integer greater than one.

14. The data transferring system of claim 13, wherein said control circuit is configured to allow the master data storage devices to be loaded sequentially by said processor, and the data is transferred on all LM conductors of the data bus at the same time.

15. The data transferring system of claim 14, wherein said master data storage devices are controlled to be written with data from said data bus at the same time, and said processor sequentially reads L-bits of data from the master data storage registers at the same time.

16. The data transferring system of claim 1, wherein said processor controls reading of the slave data storage devices for transferring data to the data bus.

17. The data transferring system of claim 16, wherein said control circuit generates read and write signals for controlling said slave data storage devices.

18. The data transferring system of claim 16, wherein said processor is an N-bit data processor producing L data bits at an output port thereof, and further including a plurality of groups of slave data storage devices, each group for storing L bits of data, and further including a different read and write signal for each said group of slave data storage devices.

19. A data transferring system, comprising:
   a processor having an N-bit output data port;
   a plurality of slave devices;
   an M×N-bit wide data bus, where M is a positive number greater than one;
   a plurality of groups of master bidirectional data registers coupling data between said processor and said data bus, each said group of master data registers storing N bits of data;
   a plurality of groups of slave bidirectional data registers coupling data between said slave devices and said data bus, each group of slave data registers storing N bits of data; and
   said processor being programmed to sequentially write data in each group of master data registers, and cause transfer of the data from the master data registers to said data bus at the same time.

20. The data transferring system of claim 19, wherein said processor is programmed to cause said slave data registers to write data therein from said data bus at the same time, and said slave devices cause data to be read from respective said slave data registers at different times.

21. The data transferring system of claim 19, further including a plurality of master address registers, an address bus and a plurality of slave address registers, and wherein said master address registers couple addresses generated by said processor to said address bus, and said slave address registers couple addresses received from said address bus to said slave devices.

22. The data transferring system of claim 21, wherein said processor causes reading and writing of said master address registers, and causes writing of addresses from said address bus into said slave address registers.

23. The data transferring system of claim 22, further including a plurality of master control signal registers, a control signal bus, and a plurality of slave control signal registers, said master control signal registers for coupling control signals from said processor to said control signal bus, and said slave control signal registers for coupling control signals from said control signal bus to said slave devices.

24. The data transferring system of claim 23, wherein said slave devices comprise hard disk drives.

25. The data transferring system of claim 24, wherein said processor is coupled to a host computer system, and said processor controls reading and writing of said hard disk drives in response to commands from said host computer system.

26. The data transferring system of claim 25, wherein said processor operates transparent to said host computer system, in that said host computer system is programmed to read and write data directly to said hard disk drives.

27. A method of transferring data from a processor to a slave device, comprising the steps of:
   sequentially loading a plurality of groups of data storage registers with data;
   transferring the sequentially loaded data from the data storage registers at the same time on a data bus to a corresponding plurality of groups of slave data storage registers;
   simultaneously writing the data from the data bus in said slave data storage registers; and
   reading data from said slave data storage registers for use by said slave devices.

28. The method of claim 27, further including transferring data from the slave devices via said slave data storage registers, said data bus and said master data storage registers to said processor.

29. The method of claim 28, further including sequentially transferring at least 32 bits at a time by said processor, and simultaneously transferring at least 256 bits of data on said data bus.

* * * * *